US012775386B2

(12) United States Patent
Xiong et al.

(10) Patent No.: US 12,775,386 B2
(45) Date of Patent: Oct. 27, 2026

(54) METHOD AND APPARATUS FOR SCHEDULING I/O REQUEST, ELECTRONIC DEVICE, STORAGE MEDIUM, SYSTEM AND COMPUTER PROGRAM PRODUCT

(71) Applicant: SAMSUNG ELECTRONICS CO., LTD., Suwon-si (KR)

(72) Inventors: Huimei Xiong, Xi'an (CN); Sizhe Xiong, Xi'an (CN); Ting Zhang, Xi'an (CN); Sungjun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/982,688

(22) Filed: Dec. 16, 2024

(65) Prior Publication Data

US 2026/0104800 A1 Apr. 16, 2026

(30) Foreign Application Priority Data

Oct. 10, 2024 (CN) ........................ 202411412260.X

(51) Int. Cl.

| | |
|---|---|
| ***G06F 3/06*** | (2006.01) |
| ***G06F 12/0862*** | (2016.01) |
| ***G06F 13/16*** | (2006.01) |
| ***G06F 16/172*** | (2019.01) |
| ***G06F 16/188*** | (2019.01) |

(52) U.S. Cl.

CPC .......... *G06F 3/0613* (2013.01); *G06F 3/0659* (2013.01); *G06F 3/0673* (2013.01); *G06F 12/0862* (2013.01); *G06F 13/1642* (2013.01); *G06F 16/172* (2019.01); *G06F 16/188* (2019.01); *G06F 2216/13* (2013.01)

(58) Field of Classification Search

None

See application file for complete search history.

(56) References Cited

U.S. PATENT DOCUMENTS 10,534,705 B2 1/2020 Lee
10,942,874 B2 3/2021 Sahoo et al.
(Continued)

FOREIGN PATENT DOCUMENTS

CN 103064636 A 4/2013

OTHER PUBLICATIONS

Chang et al. "A New Readahead Framework for SSDbased Caching Storage in IoT Systems." Jan. 2024. https://www.preprints.org/manuscript/202401.1695.*

*Primary Examiner* — Nathan Sadler
(74) *Attorney, Agent, or Firm* — Sughrue Mion, PLLC

(57) ABSTRACT

A method for scheduling an I/O request includes: acquiring information of a pending I/O request, wherein the pending I/O request comprises a first I/O request suspended in a command queue and/or a request queue, and the information of the pending I/O request comprises a request type contained in the pending I/O request; adjusting a first preset threshold value based on the acquired information of the pending I/O request, wherein the first preset threshold value is a quantity threshold value for a readahead request among a second I/O request in the request queue scheduled from a virtual file system to a block layer; scheduling the I/O request in the request queue scheduled from the virtual file system to the block layer based on the adjusted first preset threshold value.

20 Claims, 15 Drawing Sheets

(56) References Cited

U.S. PATENT DOCUMENTS

| | | | | |
|---|---|---|---|---|
| 11,188,256 | B2 | 11/2021 | Eliash et al. | |
| 11,645,007 | B2 | 5/2023 | Yoon et al. | |
| 2013/0136141 | A1 | 5/2013 | Voruganti et al. | |
| 2016/0139829 | A1* | 5/2016 | Sanzone | G06F 12/0842 711/151 |
| 2020/0034061 | A1* | 1/2020 | Khalili | G06F 3/0659 |
| 2022/0253239 | A1 | 8/2022 | Jang et al. | |
| 2023/0067749 | A1* | 3/2023 | Srinivasan | G06F 3/0655 |
| 2023/0081829 | A1* | 3/2023 | Ryu | G06F 3/061 711/154 |

* cited by examiner (a)

(b)

(c)

(a)

(b)

(a)

(b)

METHOD AND APPARATUS FOR SCHEDULING I/O REQUEST, ELECTRONIC DEVICE, STORAGE MEDIUM, SYSTEM AND COMPUTER PROGRAM PRODUCT

CROSS-REFERENCE TO RELATED APPLICATION

This U.S. non-provisional patent application claims priority under 35 U.S.C. § 119 of Chinese Patent Application No. 202411412260.X, filed on Oct. 10, 2024, the entire contents of which are hereby incorporated by reference.

BACKGROUND

The present disclosure relates to a field of operating system and storage, and specifically to a method and apparatus for scheduling I/O request, an electric device, a storage medium, a system and a computer program product.

A Linux input/output (I/O) scheduler sits between a universal block layer and a device driver layer, and it receives an I/O request from the universal block layer and tries to find a most appropriate I/O request to transmit to a block device driver. Currently, a major Linux released version uses three types of I/O schedulers of a Deadline, a Completely Fair Queuing Scheduler (CFQ), and a Noop. The CFQ is a default I/O scheduler selected by a kernel, and some devices select a Multi-Queue No-Op I/O scheduler. A user may set the Linux I/O scheduler according to different memories to optimize system performance.

Although a default host-level scheduling and a current I/O scheduling process of Universal Flash Storage (UFS) 4.0 and a Turbo Write (TW) function may achieve high read and write performance, a latency of an urgent I/O request is still significantly higher.

SUMMARY

Exemplary embodiments of the present disclosure provide a method and apparatus for scheduling I/O request, an electric device, a storage medium, a system and a computer program product, to at least solve the above technical problem and other technical problem not mentioned above.

According to an aspect of the disclosure, a method for scheduling an I/O request includes: acquiring information of a pending I/O request, wherein the pending I/O request comprises a first I/O request suspended in a command queue and/or a request queue, and the information of the pending I/O request comprises a request type contained in the pending I/O request; adjusting a first preset threshold value based on the acquired information of the pending I/O request, wherein the first preset threshold value is a quantity threshold value for a readahead request among a second I/O request in the request queue scheduled from a virtual file system to a block layer; scheduling the I/O request in the request queue scheduled from the virtual file system to the block layer based on the adjusted first preset threshold value.

According to an aspect of the disclosure, the scheduling the second I/O request in the request queue scheduled from the virtual file system to the block layer based on the adjusted first preset threshold value comprises: scheduling one or more I/O requests scheduled from the virtual file system to the block layer based on the adjusted first preset threshold value; dispatching, to an asynchronous queue and a synchronous queue under a corresponding task, the one or more I/O requests scheduled to the block layer, wherein a request type dispatched to the synchronous queue comprises a synchronous request and a readahead request, and a request type dispatched to the asynchronous queue comprises an asynchronous write request; allocating corresponding priorities to the synchronous queue and the asynchronous queue, wherein the synchronous queue has a higher priority than the asynchronous queue; scheduling the one or more I/O requests in the synchronous queue and the asynchronous queue to the request queue of the block layer based on the allocated priorities.

According to an aspect of the disclosure, wherein in the synchronous queue, the synchronous request has a higher priority than the readahead request.

According to an aspect of the disclosure, the method further includes: adjusting a second preset threshold value and/or a third preset threshold value based on the information of the pending I/O request, wherein the second preset threshold value is a quantity threshold value for a readahead request scheduled in the block layer, and the third preset threshold value is a quantity threshold value for an asynchronous write request scheduled in the block layer; scheduling the readahead request to be scheduled in the block layer and/or the asynchronous write request to be scheduled in the block layer based on the adjusted second preset threshold value and/or third preset threshold value.

According to an aspect of the disclosure, the adjusting the second preset threshold value and/or the third preset threshold value based on the information of the pending I/O request includes: adjusting a sum of the second preset threshold value and the third preset threshold value to a maximum length of a request queue that is processed by a storage system or an I/O controller, in a case where the pending I/O request does not contain a synchronous request.

According to an aspect of the disclosure, the adjusting the second preset threshold value and/or the third preset threshold value based on the information of the pending I/O request comprises: decreasing a sum of the second preset threshold value and the third preset threshold value in a case where the pending I/O request contains a synchronous request.

According to an aspect of the disclosure, the method further includes: dispatching, to a plurality of request queues corresponding to request types, respectively, one or more I/O requests scheduled to an I/O controller; allocating corresponding weights to respective request queues in the plurality of request queues based on the request types that the respective request queues are respectively dispatched; determining a write order corresponding to respective request queues based on the corresponding weights allocated to the respective request queues; sequentially writing the one or more I/O requests dispatched to the respective request queues to a storage system based on the write order corresponding to the respective request queues.

According to an aspect of the disclosure, the sequentially writing the one or more I/O requests dispatched to the respective request queues to the storage system based on the write order corresponding to the respective request queues further comprises: acquiring ratios between different levels of weights in the corresponding weights of the respective request queues, and adjusting the corresponding weights of the respective request queues based on a preset range of ratios, wherein the corresponding weights of the respective request queues are divided into a plurality of levels according to a weight value; writing, to the storage system, the one or more I/O requests dispatched to the respective request queues based on the adjusted corresponding weights of the respective request queues.

According to an aspect of the disclosure, the sequentially writing the one or more I/O requests dispatched to the respective request queues to the storage system based on the write order corresponding to the respective request queues further comprises: sequentially writing the one or more I/O requests dispatched to the respective request queues to a corresponding buffer in the storage system based on the write order corresponding to the respective request queues.

According to an aspect of the disclosure, the method further includes resizing the corresponding buffer in the storage system based on the corresponding weights allocated to the respective request queues and the number of the request queues.

According to an aspect of the disclosure, the corresponding weights allocated to the respective request queues are used to prioritize writing an I/O request with a type of an update frequency that exceeds a threshold and/or a read frequency that exceeds the threshold.

According to an aspect of the disclosure, the sequentially writing the one or more I/O requests dispatched to the respective request queues to the corresponding buffer in the storage system based on the write order corresponding to the respective request queues further comprises: sequentially writing, to the corresponding buffer in the storage system, a synchronous read request and/or a read request from a foreground application, a synchronous write request, a readahead request, and an asynchronous request from a background application.

According to an aspect of the disclosure, the adjusting the first preset threshold value based on the acquired information of the pending I/O request further comprises: decreasing or maintaining the first preset threshold value in a case where the pending I/O request comprises a synchronous request; and/or increasing the first preset threshold value in a case where the pending I/O request comprises at least a preset number of asynchronous write requests, wherein the information of the pending I/O request further comprises a number of asynchronous write requests in the pending I/O request.

According to an aspect of the disclosure, an apparatus for scheduling an I/O request, includes a memory storing one or more instructions; and a processor operatively coupled to the memory and configured to execute one or more instructions stored in the memory, wherein the one or more instructions, when executed by the processor, cause the apparatus to: acquire information of a pending I/O request, wherein the pending I/O request comprises a first I/O request suspended in a current command queue and/or a request queue, and the information of the pending I/O request comprises a request type contained in the pending I/O request; adjust a first preset threshold value based on the acquired information of the pending I/O request, wherein the first preset threshold value is a quantity threshold value for a readahead request among a second I/O request in the request queue scheduled from a virtual file system to a block layer; schedule the I/O request in the request queue scheduled from the virtual file system to the block layer based on the adjusted first preset threshold value.

According to an aspect of the disclosure, the one or more instructions, when executed by the processor, further cause the apparatus to: schedule one or more I/O requests scheduled from the virtual file system to the block layer based on the adjusted first preset threshold value; dispatch, to an asynchronous queue and a synchronous queue under a corresponding task, the one or more I/O requests scheduled to the block layer, wherein a request type dispatched to the synchronous queue comprises a synchronous request and a readahead request, and a request type dispatched to the asynchronous queue comprises an asynchronous write request; allocate corresponding priorities to the synchronous queue and the asynchronous queue, wherein the synchronous queue has a higher priority than the asynchronous queue; schedule the one or more I/O requests in the synchronous queue and the asynchronous queue to the request queue of the block layer based on the allocated priorities.

According to an aspect of the disclosure, wherein in the synchronous queue, the synchronous request has a higher priority than the readahead request.

According to an aspect of the disclosure, the one or more instructions, when executed by the processor, further cause the apparatus to: adjust a second preset threshold value and/or a third preset threshold value based on the information of the I/O request, wherein the second preset threshold value is a quantity threshold value for a readahead request scheduled in the block layer, and the third preset threshold value is a quantity threshold value for an asynchronous write request scheduled in the block layer; schedule the readahead request to be scheduled in the block layer and/or the asynchronous write request to be scheduled in the block layer based on the adjusted second preset threshold value and/or third preset threshold value.

According to an aspect of the disclosure, the one or more instructions, when executed by the processor, further cause the apparatus to: adjust a sum of the second preset threshold value and the third preset threshold value to a maximum length of a request queue that is processed by a storage system or an I/O controller, in a case where the pending I/O request does not contain a synchronous request.

According to an aspect of the disclosure, the one or more instructions, when executed by the processor, further cause the apparatus to: decrease a sum of the second preset threshold value and the third preset threshold value in a case where the pending I/O request contains a synchronous request.

According to an aspect of the disclosure, the one or more instructions, when executed by the processor, further cause the apparatus to: dispatch, to a plurality of request queues corresponding to request types, respectively, one or more I/O requests scheduled to an I/O controller; allocate corresponding weights to respective request queues in the plurality of request queues based on the request types that the respective request queues are respectively dispatched; determine a write order corresponding to respective request queues based on the corresponding weights allocated to the respective request queues; write the one or more I/O requests dispatched to the respective request queues to a storage system based on the write order corresponding to the respective request queues.

According to an aspect of the disclosure, the one or more instructions, when executed by the processor cause the apparatus to: acquire ratios between different levels of weights in the corresponding weights of the respective request queues, and adjust the corresponding weights of the respective request queues based on a preset range of ratios, wherein the corresponding weights of the respective request queues are divided into a plurality of levels according to a weight value; write, to a storage system, the one or more I/O requests dispatched to the respective request queues based on the adjusted corresponding weights of the respective request queues.

According to an aspect of the disclosure, when executed by the processor, cause the apparatus to: sequentially write the one or more I/O requests dispatched to the respective request queues to a corresponding buffer in the storage system based on the write order corresponding to the respective request queues.

According to an aspect of the disclosure, the one or more instructions, when executed by the processor cause the apparatus to: resize the corresponding buffer in the storage system based on the corresponding weights allocated to the respective request queues and the number of the request queues.

According to an aspect of the disclosure, the corresponding weights allocated to the respective request queues are used to prioritize writing an I/O request with a type of an update frequency that exceeds a threshold and/or a read frequency that exceeds the threshold.

According to an aspect of the disclosure, the one or more instructions, when executed by the processor, cause the apparatus to: sequentially write, to the corresponding buffer in the storage system, a synchronous read request and/or a read request from a foreground application, a synchronous write request, a readahead request, and an asynchronous request from a background application.

According to an aspect of the disclosure, the one or more instructions, when executed by the processor, cause the apparatus to: decrease or maintain the first preset threshold value in a case where the pending I/O request comprises a synchronous request; and/or increase the first preset threshold value in a case where the pending I/O request comprises at least a preset number of asynchronous write requests, wherein the information of the pending I/O request further comprises a number of asynchronous write requests in the pending I/O request.

BRIEF DESCRIPTION OF DRAWINGS

The accompanying drawings herein, which are incorporated into and form a part of the specification, illustrate embodiments consistent with the present disclosure and are used in conjunction with the specification to explain the principles of the present disclosure and do not constitute an undue limitation of the present disclosure.

DETAILED DESCRIPTION

Figure 1:
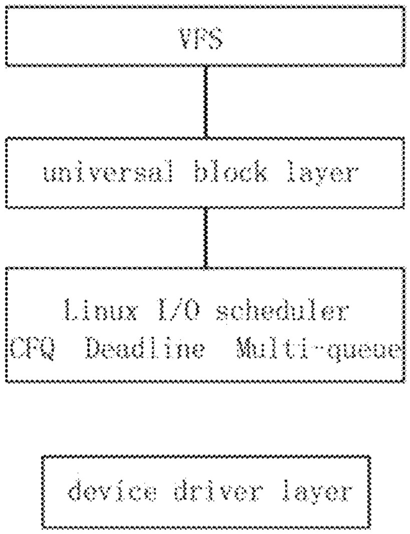
FIG. 1 illustrates a block diagram of an I/O subsystem of an operating system.

In order to enable a person of ordinary skill in the art to better understand technical solutions of the present disclosure, the technical solutions in the embodiments of the present disclosure will be described clearly and completely in the following, in conjunction with the accompanying drawings.

It is noted that terms "first", "second" and the like in the specification and claims of the present disclosure and the above accompanying drawings are used for distinguishing similar objects, and need not to be used for describing a particular order or sequence. It should be understood that data so used may be interchanged, where appropriate, so that the embodiments of the present disclosure described herein may be implemented in an order other than those illustrated or described herein. The embodiments described in the following embodiments do not represent all embodiments consistent with the present disclosure. Rather, they are only examples of apparatuses and methods consistent with some aspects of the present disclosure as detailed in the appended claims. In the present disclosure, a singular form such as "a", "an" or "the" may also refer to a plural form.

It is noted herein that a phrase "at least one of several items" as it appears in the present disclosure is intended to encompass three parallel cases of "any one of the several items", "a combination of any number of the several items", and "all of the several items". For example, "including at least one of A and B" includes the following three parallel cases: (1) including A; (2) including B; and (3) including A and B. Another example is "performing at least one of operation 1 and operation 2", which represents the following three parallel cases: (1) performing operation one; (2) performing operation two; and (3) performing operation one and operation two.

An I/O request (input/output request) is a request for a computer system to operate on its input/output device (I/O device). The I/O device may be in a form of a hard disk drive, a solid state drive, a USB device, a network interface card, a display, a keyboard, etc. An operating system is typically responsible for managing these I/O requests, using a device driver to interact with a hardware device and providing services such as buffering, queuing, and scheduling to improve efficiency and performance of an I/O operation.

The I/O request is a broad concept that may cover all types of input and output operations, while read/write operations are specific instances of the I/O request that may be specialized to data read and write operations in scenarios where data is transferred between storage medias or networks.

When an I/O request is initiated from an application layer, it passes through an operating system (including a file system layer and a block layer) and then to a device controller, which may ultimately manipulate an actual storage device to complete an I/O operation corresponding to the I/O request. Throughout the process, the request may be queued for processing in a queue at the block layer and in a queue at the device controller.

FIG. 1 illustrates a block diagram of an I/O subsystem of an operating system.

Referring to FIG. 1, an I/O subsystem of a Linux operating system is present in a kernel of the operating system and may include a Virtual File System (VFS), a universal block layer, a Linux I/O scheduler, and a device driver layer.

Specifically, the VFS provides a unified interface for various file systems, allowing the operating system to access and manage different types of file systems in a standardized way.

The universal block layer may be regarded as an abstraction of a block device, which may be viewed as a data space consisting of a number of sectors, and the block layer may provide a unified processing mechanism for read and write requests from an upper layer. In one or more examples, a block device may provide buffered access to hardware devices. The block device may allow read and write of blocks of any desired size.

The role of the I/O scheduler may include sequencing and scheduling I/O requests according to a certain strategy to optimize the performance of the I/O operation. It is responsible for determining a good order to execute these I/O requests in order to improve the overall system performance and reduce the average waiting time required for I/O completion. The I/O scheduler may include scheduling strategies such as a Deadline, a CFQ, a Multi-queue, etc. These scheduling strategies may also be used in conjunction with each other to achieve efficient I/O performance according to specific needs. Among them, the CFQ is usually a default I/O scheduler selected by the kernel, and the CFQ scheduler allows for priority-driven fair scheduling using a type and category of each I/O request, and allows synchronous requests to preempt asynchronous request.

The VFS, the universal block layer, and the I/O scheduler may all be considered part of host-level scheduling.

The device driver layer may provide an interface to communicate with a specific hardware device, which may translate an I/O requests into an instruction that hardware can identify and interact with the hardware to accomplish data read and write operations.

The I/O subsystem may process and manage requests related to I/O devices through collaborative work between different layers, including providing a unified interface for an upper-layer application, while optimizing access efficiency of underlying hardware, etc., to realize a complete process from an I/O request of the upper-layer application to an access of the underlying hardware.

UFS 4.0 may be used as an example, or applied to other related devices, where the UFS itself is not directly involved in the scheduling of I/O requests, but serves as a storage medium to provide fast and stable data read and write services, supporting the I/O scheduler to effectively manage and schedule the I/O requests. UFS 4.0 may be a type of flash storage used, for example, for mobile devices and computing systems that require high performance and low power consumption. UFS 4.0 may have a full-duplex interface that allows simultaneous read and write operations.

Figure 2:
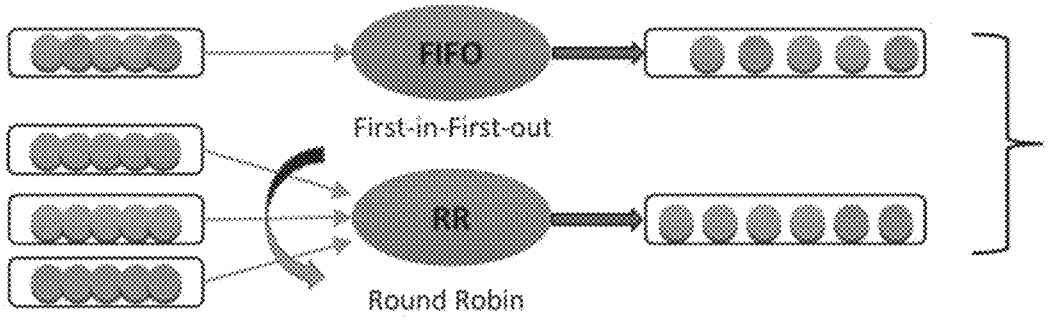
FIG. 2 illustrates a diagram of two scheduling techniques involved in device-level scheduling.

FIG. 2 illustrates a diagram of two scheduling techniques involved in device-level scheduling.

Referring to FIG. 2, the device-level scheduling may support scheduling techniques such as single-queue First-in-First-out (FIFO) and multi-queue Round-robin (RR) Arbitration.

The single-queue FIFO is scheduling strategy in which all I/O requests are placed into a single queue, and all I/O requests are processed in an order in which they enter the queue. This strategy is suitable for scenarios where requests have similar priorities, and response time requirements are not particularly stringent, thereby enabling requests to be handled on a first come first serve basis.

The multi-queue RR arbitration is a more flexible scheduling strategy compared to the FIFO scheduling strategy. Under this strategy, I/O requests may be categorized and placed into different queues, each of which may correspond to a different priority, request type, or device. The scheduler may process the requests in these queues sequentially according to a certain strategy (e.g., polling). Such a strategy can better handle I/O requests with different priorities and demands, providing finer-grained control and management.

The single-queue FIFO and the multi-queue RR arbitration may have the following characteristics:

(1) An admin Submission Queue (SQ) (submission queue for administrative commands) has a same priority as an I/O SQ (submission queue for I/O requests);

(2) The device controller obtains a certain number of commands from all submission queues in a sequential or cyclic manner.

UFS 4.0 may be used as an example, or applied to other related devices. For the device-level scheduling of UFS 4.0, a command queue on it allows multiple I/O requests to hang in the queue, where a Multiple Command Queue (MCQ) RR scheduling strategy may support parallel I/O request allocation to achieve high-performance read and write.

Figure 3:
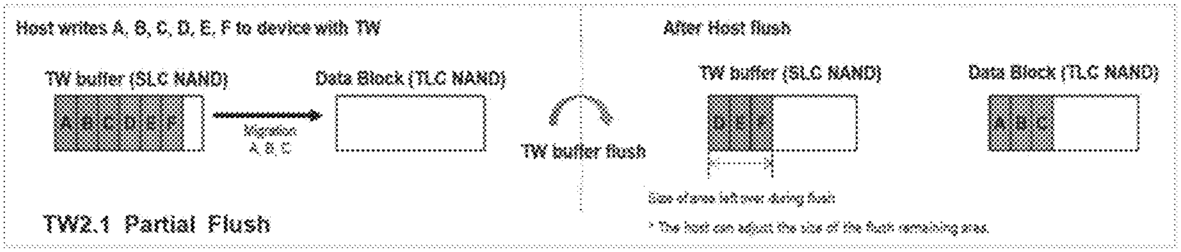
FIGS. 3(*a*)-(*c*) illustrate three main functions of TW.
Figure 3:
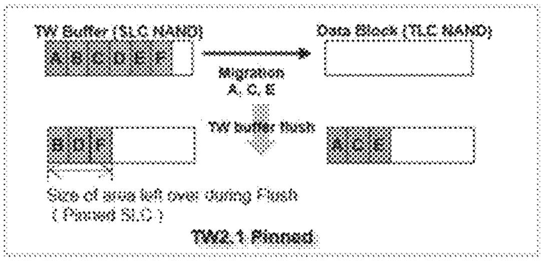
Figure 3:
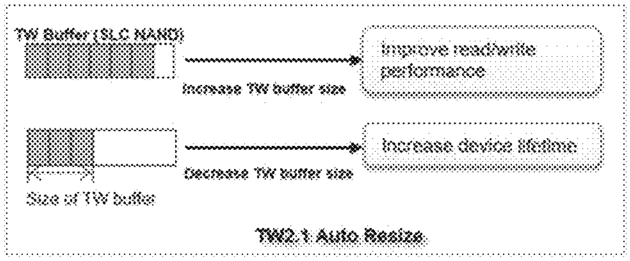

FIGS. 3(*a*)-(*c*) illustrate three main functions of TW.

In FIGS. 3(*a*)-(*c*), a Single-Level Cell (SLC), a Triple-Level Cell (TLC), and a Quad-Level Cell (QLC) are different types of storage cells, and a NAND is a type of flash technology.

A traditional flush operation will write data of entire buffer (e.g., a SLC buffer) to a main storage area (e.g., a TLC/QLC NAND), which may cause a large latency and increase write burden on the main storage area.

A TW technology is typically used in conjunction with a buffer (e.g., a SLC buffer) in a Solid State Disk or Solid State Drive (SSD). When writing data, the SSD first tries to write the data to the high-speed buffer to increase a write speed as well as improve performance of a TLC NAND-based SSD.

For Turbo Write 2.1 (TW 2.1), a new standard for UFS 4.0, includes three main functions:

Partial Flush: The host may flush only a portion of a TW buffer.

In order to reduce the write burden of the main storage area, the partial flush mechanism of Turbo Write may be introduced. Under this mechanism, when the buffer needs to release space, instead of flushing data of the whole buffer at once, only a part of the data is flushed.

For example, referring to FIG. 3(*a*), when the host writes/migrates task data corresponding to I/O requests in data blocks A, B, C, D, E, and F to a device via TW, the partial flush mechanism may select and flush data blocks that are no longer needed or of lower priority (assuming data blocks A, B, and C), and reserve data blocks that are still frequently accessed or important (assuming data blocks D, E, F) in the buffer. In other words, the host may resize the reserved area during the buffer flush process. The amount of data being flushed may be variable depending on a particular situation.

(2) Pinned TW: the buffer may be pinned, and the pinned buffer may be resized dynamically.

For example, referring to FIG. 3(*b*), when the host transmits a write request to the SSD, the host may first write data (e.g., A, B, C, D, E, F) to the TW buffer, in which a higher performance storage cell (e.g., SLC) is usually used, to provide a faster write speed. The Pinned TW mechanism may use a portion of an internal storage space of the SSD as the pinned high-speed buffer (e.g., B, D, F), making it possible to migrate only another portion (e.g., A, C, E) of the data to the main storage area during the flush process. The size of the reserved area during the flush process is the pinned SLC buffer.

(3) Auto Resize: The host may dynamically resize the SLC in real time according to data write situations.

For example, referring to FIG. 3(*a*), for resizing the TW buffer, increasing the size of the TW buffer enables high performance read and write operations, while decreasing the size of the TW buffer improves the lifetime of the storage device.

Although the default host-level scheduling and the current I/O scheduling process of UFS 4.0 as well as the TW function may achieve read and write operations with high performance, the increase in latency of an urgent I/O request remains significant. The latency of the I/O request remains significant due to the following reasons:

(1) Priority reverse in a Command Queue;

(2) Read and write interference in the Command Queue;

(3) TW buffer sequential write strategy leads to its low utilization rate.

As understood by one of ordinary skill in the art, an I/O request in a Request Queue may be mapped to a command in the Command Queue. The request is first processed by the I/O scheduler of the operating system, and is then transmitted to the command queue of the storage device for execution. Thus, the request queue is an abstraction at the operating system level for managing and scheduling an I/O request, while the command queue is a concept at the hardware level for scheduling a command within the storage device.

The read and write interference typically occurs in concurrent environments, such as when multiple processes or thread read and write simultaneously to share resources without a proper synchronization mechanism. If multiple readers and writers are allowed to operate on shared resources simultaneously, then inconsistent or competing conditions for data may occur. For example, if one thread tries to read data while another thread is writing the same data, the read thread may get a partially updated, inconsistent data (e.g., corrupted data), thereby leading to an error or unpredictable behavior.

In related technology, the host may use CFQ scheduling to reduce the impact of queuing in a command queue, but this method does not take into account the problem of priority reverse caused by a readahead. As understood by one of ordinary skill in the art, priority reverse may occur when a high-priority task is superseded by a lower priority task. As understood by one of ordinary skill in the art, a readahead request or operation may be a system call of an application (e.g., Linux kernel) that loads data (e.g., file contents) into a temporary memory (e.g., page cache). This feature prefetches the data so that when it is subsequently accessed, the data is read from the main memory (RAM) rather than from a hard disk drive (HDD), resulting in much lower file access latencies.

The CFQ may be an I/O scheduling algorithm in the Linux kernel that creates a separate queue for each process that issues an I/O request and uses time-slice round robin to serve these queues. The CFQ is designed to ensure a fair distribution of I/O time, so that each process gets a proportional amount of I/O bandwidth.

Figure 4:
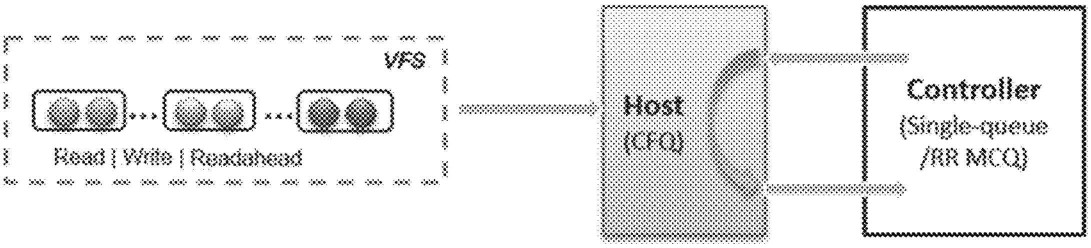
FIG. 4 illustrates a schematic diagram of host-level CFQ scheduling.

FIG. 4 illustrates a schematic diagram of host-level CFQ scheduling.

Referring to FIG. 4, after a VFS receives an I/O request from a computer system to operate on its input/output device, e.g., a request to read, write, readahead, etc., host-level scheduling may be performed via a CFQ scheduling algorithm with a single-queue or round-robin multiple command queue in a controller (or a scheduler, a device controller) to reduce the impact of queuing in a command queue through CFQ scheduling of the host.

In one or more examples, Round-robin (RR) arbitration of the device scheduler does not support priority-driven scheduling, which may lead to frequent priority reverse and a significant increase in latency of high-priority I/O.

Figure 5:
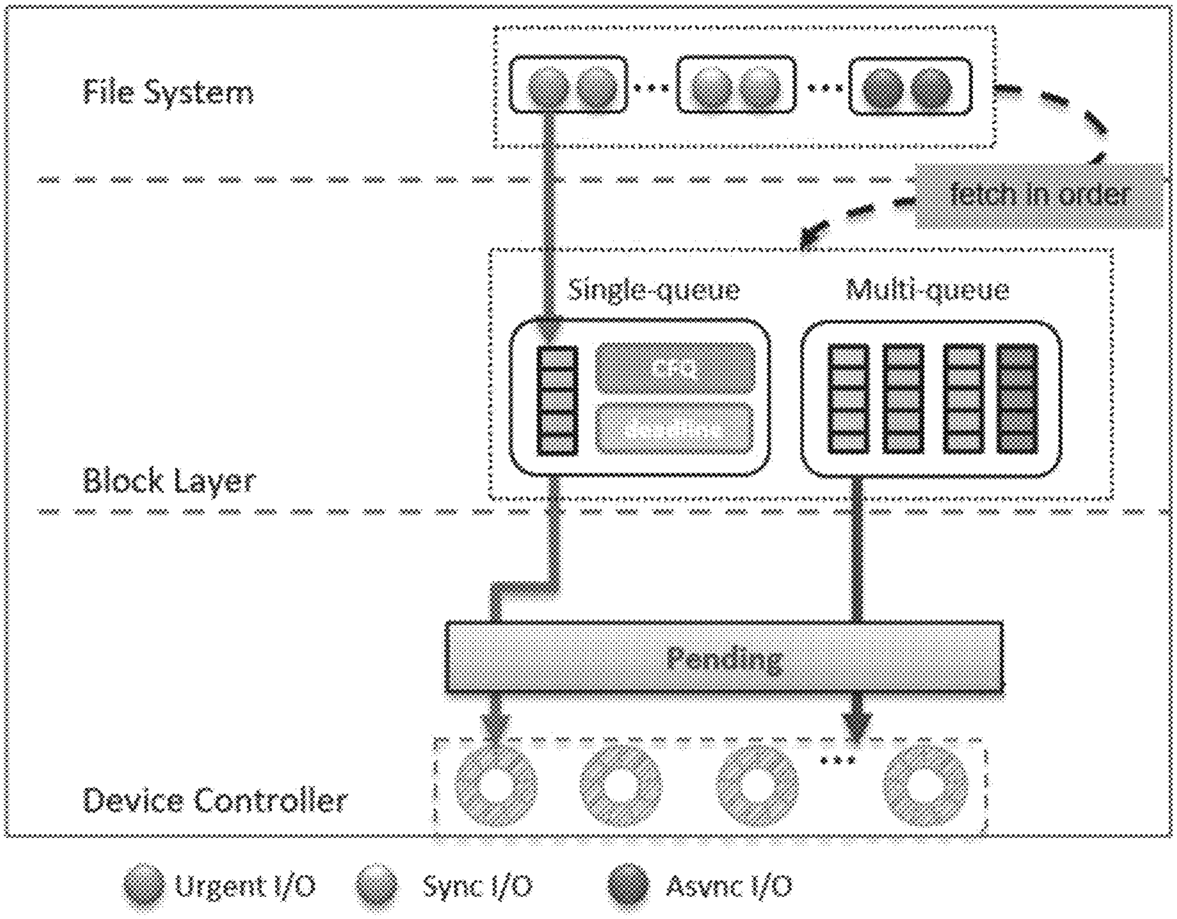
FIG. 5 illustrates a schematic diagram of device-level round-robin arbitration.

FIG. 5 illustrates a schematic diagram of device-level round-robin arbitration.

Referring to FIG. 5, a host-level scheduler may support other devices handling urgent I/O requests through a combination of a file system and a block layer, through a single-queue CFQ or deadline scheduling algorithm, or through a multi-queue. However, a device-level scheduler does not support other devices handling the urgent I/O requests, which results in a higher number of pending I/Os. A large number of pending requests in turn leads to a significant increase in latency of the urgent I/O. The more pending read requests that become accumulated, the higher latency of an urgent I/O request becomes in a mixed workload.

For storing data in a TW buffer, a write strategy of the TW buffer may be a sequential write, and the higher the utilization of TW, the better the performance becomes.

Modern mobile devices may provide a user with a multi-task environment that runs multiple applications at the same time, and running the multi-task environment brings high efficiency as well as the following problems:

(1) There is higher interference between foreground and background applications and I/O request priority reverse is increased.

(2) The pinned TW is mostly occupied by background pending requests, resulting in that the response time of the foreground applications that frequently update will be increased.

(3) The latency of foreground application requests is increased because the TW buffer is mostly occupied by readahead and background application requests.

In one or more examples, a foreground application may be an application that is visible to a user on a screen during execution, and a background application may be an application that is being executed without being visible to the user. These scenarios result in the TW buffer being occupied by more data that is not urgent or not be updated frequently, resulting in high latency for urgent applications.

Figure 6:
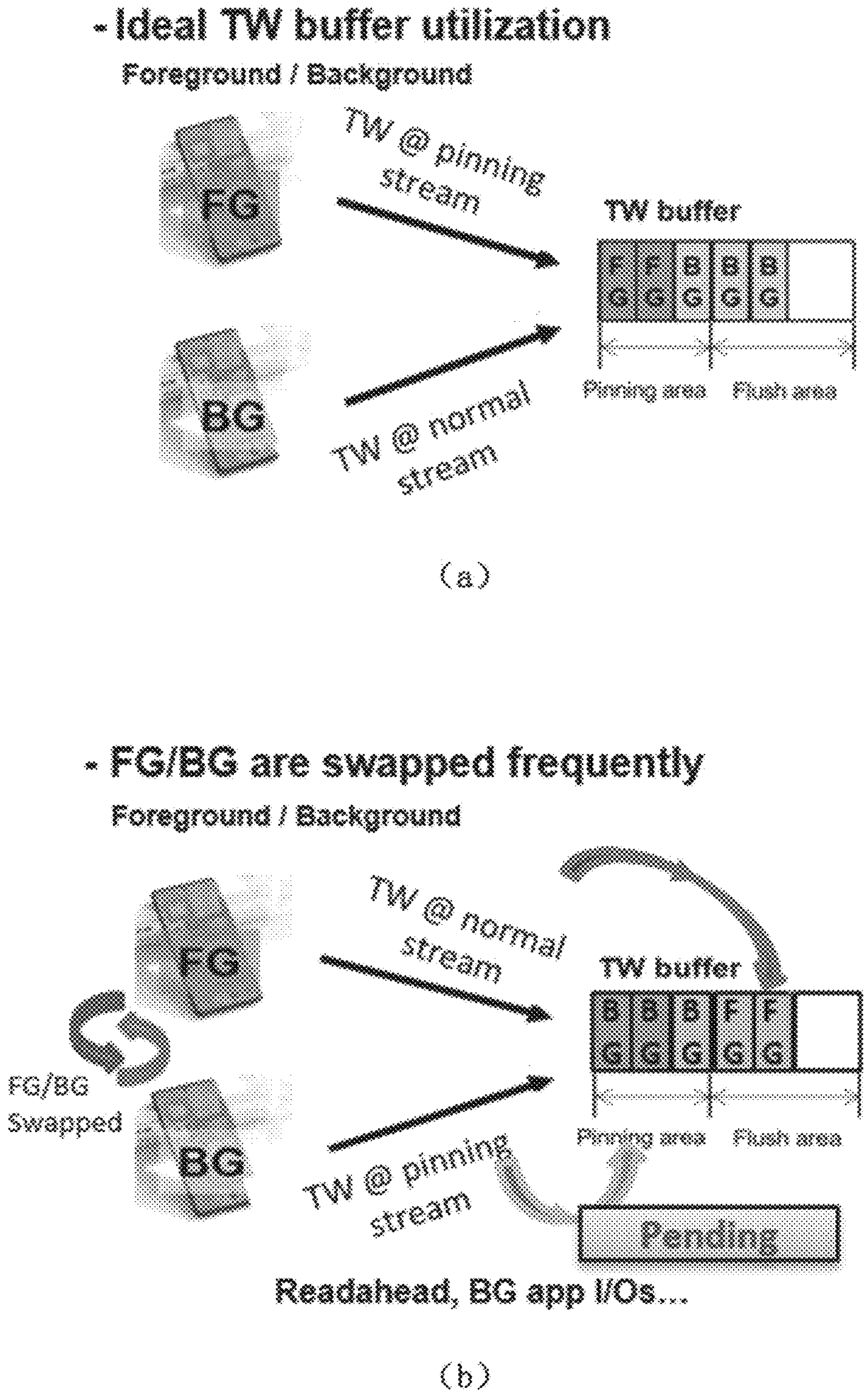
FIGS. 6(*a*)-(*b*) illustrate a schematic diagram of a relationship between a multi-task environment and TW buffer utilization.

FIGS. 6(*a*)-(*b*) illustrate a schematic diagram of a relationship between a multi-task environment and TW buffer utilization.

Referring to FIGS. 6(*a*)-(*b*), in a TW technology, when data is written in a pinning stream, the data is locked to a specific storage area for fast access and processing. The pinning stream refers to a data stream exchanged between an application (e.g., an emergency application such as a foreground application) and a pinning area in the cache. A normal stream refers to a regular data stream without special optimization. In the TW technology, not all write operations will use the pinning stream; some write operations that are less critical or do not need to be accelerated may be performed via the normal stream to maintain the overall performance and balance of the system.

In the TW technology, a pinning area may be an area in a memory used to store data that needs to be accessed and processed quickly. A flush area may be used to store data that has not yet been persisted to a final storage medium (e.g., a NAND flash); the data in the flush area is usually written to the final storage medium gradually according to a certain strategy (e.g., FIFO).

Referring to FIG. 6(*a*), the following scenario enables an idealized TW buffer utilization: a foreground application writes a pinning area in a TW buffer preferentially in a pinning stream manner, and a background application write a flush area in the TW buffer primarily in a normal stream manner.

However, referring to FIG. 6(*b*), generally, due to the frequent switching between the foreground application and the background application, the following scenario may occur: the foreground application writes mainly in the flush area in the TW buffer in the normal stream manner, and the background application writes first in the pinning area in the TW buffer in the pinning stream manner, which results in that a readahead request, an I/O request of the background application, are ranked in the forefront of pending requests, while an I/O request of the foreground application is severely delayed in processing and causes low utilization of the TW buffer.

On the contrary, it is expected that TW2.1 is efficiently utilized to:

(1) reduce read request latency;

(2) reduce processing consumption in storing frequently updated data.

In order to address the above mentioned, or any other problems associated with these technologies, the present disclosure provides a method and apparatus for scheduling an I/O request, an electronic device, a storage medium, a system, and a computer program product, which may adjust a quantity threshold value for a readahead request scheduled from a virtual file system to a block layer based on a request type included in a currently pending I/O request, thereby dynamically and proactively increasing/decreasing a suspended readahead request to yield task execution resources to an I/O request of a type that has a higher update frequency and/or read frequency or more affects user experience, such as yielding to a synchronization request, etc.; and, in a case of an abundance of current task execution resources, utilization of a storage device may be improved by increasing the quantity threshold value for the readahead request scheduled from the virtual file system to the block layer. Analyzing a type component of a pending request and combining it with limited readahead requests may avoid significant increase in latency of high-priority I/O due to priority reverse caused by readahead, and may increase storage utilization to achieve Host-level Aware Scheduling (HAS). In one or more examples, an I/O request may have a higher update frequency when the update frequency of the I/O request exceeds a threshold. In one or more examples, an I/O request may have a higher read frequency when the read frequency of the I/O request exceeds the threshold.

In the following, the method and apparatus for scheduling an I/O request, the electronic device, the storage medium, the system, and the computer program product of the present disclosure will be specifically described with reference to FIGS. 7 through 15.

Figure 7:
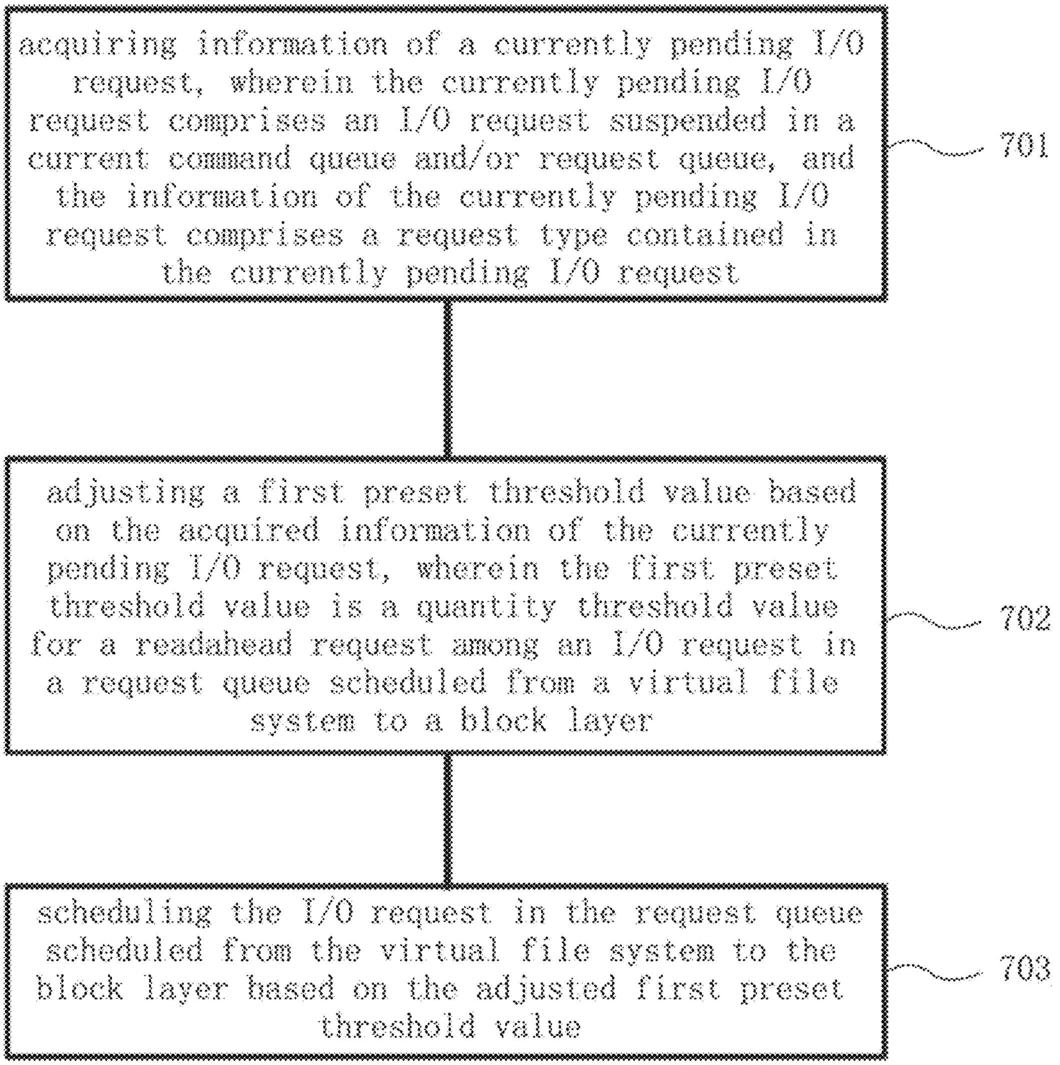
FIG. 7 illustrates a flowchart of a scheduling method for I/O requests in one or more embodiments of the present disclosure.

FIG. 7 illustrates a flowchart of a scheduling method for I/O requests in one or more embodiments of the present disclosure.

Referring to FIG. 7, at operation 701, information of a currently pending I/O request may be acquired, wherein the currently pending I/O request may include an I/O request suspended in a current command queue and/or request queue, and the information of the currently pending I/O request may include, but is not limited to, a request type contained in the currently pending I/O request.

According to one or more embodiments of the present disclosure, a process of I/O scheduling and storing data involves an associated file system, block layer, device controller, and device storage. A distinction may be made at the file system (VFS) on types of I/O requests, e.g., a read request and a readahead request, etc. The file system may obtain the information of the currently pending I/O request, e.g., may detect which request type(s) are included in the currently pending I/O request. In one example, the currently pending I/O request may include I/O request(s) suspended in a current command queue and/or request queue. In one or more examples, a block layer may be part of an operating system (e.g., Linux kernel) which implements the interface that applications and file systems use to access various storage devices. The block layer may handle requests for one or more block devices in a system. The data structure of the block layer may include a descriptor of an ongoing I/O block device operation referred to as a bio. A bio may include one or more segments that describe the memory areas involved in an I/O operation. The functions of the block layer include, but are not limited to: putting data buffers in high memory, implementing a "zero-copy" schema, managing logical volumes, and exploiting the advanced features of the most recent disk controllers. According to one or more embodiments of the present disclosure, the VFS may monitor a pending I/O request in the command queue. The type of the currently pending I/O request may be identified by a process ID and the number of I/O requests of each type may be counted.

At operation 702, a first preset threshold value may be adjusted based on the acquired information of the currently pending I/O request, wherein the first preset threshold value is a quantity threshold value for a readahead request among an I/O request in a request queue scheduled from a virtual file system to a block layer.

According to one or more embodiments of the present disclosure, when the acquired information of the currently pending I/O requests indicates that the currently pending I/O request contains a request of a type that adversely affects the user experience or has a higher update frequency and/or read frequency, such as a synchronous request, in order to allocate more processing resources to the request of the type that adversely affects the user experience or has a higher update frequency and/or a higher read frequency, a quantity threshold value for a request that less adversely affects the user experience or has a lower update frequency and/or read frequency (e.g., a readahead request) among the I/O requests scheduled from the virtual file system scheduling to the block layer may be adjusted to limit the number of similar requests such as the suspended readahead request and to avoid the problem of priority reverse caused by readahead. In this regard, when a particular I/O request is of a type that is determined to consume more resources, the number of such I/O requests is limited from entering a queue. In one or more examples, the number of such of I/O requests is limited until processing of the particular I/O request is completely finished, or until the processing of the particular I/O request reaches a predetermined processing stage.

According to one or more embodiments of the present disclosure, the readahead request is usually generated by a background kernel thread, and thus, is characterized by having less impact on user experience or a lower update frequency and/or read frequency. In contrast, a read/write request generated by a user application is typically characterized by having more impact on user experience or a higher update frequency and/or read frequency.

According to one or more embodiments of the present disclosure, an adjustment operation for increasing the first preset threshold value may be performed only if it is detected that a sequential read mode is currently being used. As understood by one of ordinary skill in the art, a sequential read mode may include reading and writing records in a file in a serial manner. It will be appreciated that if an application is reading a large file and reading in an order of files, the file system may predict a next read operation and may preload next data into a memory (i.e., more readahead requests may be generated in the sequential read mode). Conversely, if the read mode of the application is unpredictable or random, the file system may process each individual read request without a lot of readahead (e.g., modes such as random read may not generate many readahead requests). Whereas the logic for deciding on sequential read or random read is primarily done at the VFS or the higher level file system layer, the block layer is responsible for performing these decisions and interacting with the hardware.

According to one or more embodiments of the present disclosure, the operation of adjusting the first preset threshold value may be used only when there is no pending synchronous request and read/write interference may be present, to yield task execution resources such as a storage bandwidth to an I/O request of a type that has a higher update frequency and/or read frequency or more affects the user experience. Understandably, read/write interference typically occurs in concurrent environments; when multiple processes or thread read and write simultaneously to share resources without a proper synchronization mechanism, inconsistent or competing conditions for data may occur if multiple readers and writers are allowed to operate on the shared resources simultaneously; e.g., if one thread is attempting to read data while another thread is writing the same data, the read thread may get inconsistent or corrupted data, which is partially updated, leading to an error or unpredictable behavior. To prevent read and write interference, a synchronization mechanism may be used to ensure that a write operation is in progress while other read or write operations are blocked, or that multiple read operations are allowed to proceed simultaneously, but any other read or write operation is blocked while the write operations are in progress.

According to one or more embodiments of the present disclosure, the adjusting the first preset threshold value based on the acquired information of the currently pending I/O request may specifically include operations of: decreasing or maintaining the first preset threshold value in a case where the currently pending I/O request includes a synchronous request; and/or increasing the first preset threshold value in a case where the currently pending I/O request includes at least a preset number of asynchronous write requests, wherein the information of the currently pending I/O request further includes a number of asynchronous write requests in the currently pending I/O request.

According to one or more embodiments of the present disclosure, the number of synchronous requests in the currently pending I/O request may be identified by the process ID, and the first preset threshold value may not be increased as long as there is any I/O request whose type is the synchronous request in the currently pending I/O request.

According to one or more embodiments of the present disclosure, whether an asynchronous write request is included in the currently pending I/O request may be detected, and the number of asynchronous write requests may be counted to generate the information of the currently pending I/O request. In a case where the currently pending I/O request contains at least a predetermined number of asynchronous write requests, the first preset threshold value may be increased. The predetermined number may be marked with a symbol ϕ or the like for ease of expression. The predetermined number may also be easy to express in a program language by setting an asynchronous constant value.

It will be appreciated that asynchronous write is prone to cause read/write interference, and therefore, in a case where the currently pending I/O request contains relatively many asynchronous write requests, the first preset threshold value may be increased to allow a plurality of read operations to be performed simultaneously in order to prevent read/write interference.

According to one or more embodiments of the present disclosure, if there are only relatively few I/O requests among the currently pending I/O request that less adversely affect the user experience or have a lower update frequency and/or read frequency, then the first preset threshold value may be increased to utilize the storage bandwidth more efficiently.

At operation 703, the I/O request in the request queue scheduled from the virtual file system to the block layer may be scheduled based on the adjusted first preset threshold value.

According to one or more embodiments of the present disclosure, the quantity threshold value for the readahead request among the I/O request in the request queue scheduled from the virtual file system to the block layer may be limited by the first preset threshold value, and the first preset threshold value may be adjusted. The scheduling of the I/O request based on the first preset threshold value may dynamically and proactively increase/decrease pending readahead requests by adjusting the first preset threshold value. In one example, a notation such as RAmax may indicate the first preset threshold value for ease of expression.

According to one or more embodiments of the present disclosure, the operation of dynamically adjusting the quantity threshold value for the readahead request in the I/O request scheduled from the VFS to the block layer multi-queue may be viewed as implementing a Dynamic Readahead (DRA) module for scheduling a host-level I/O readahead requests in the file system.

Figure 8:
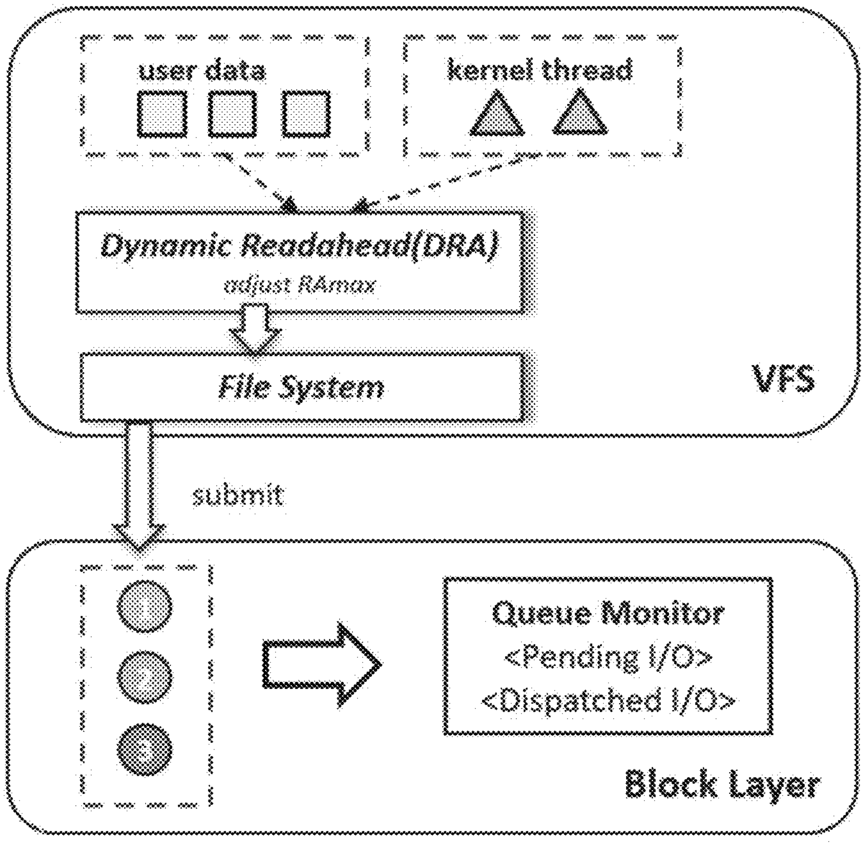
FIG. 8 illustrates a schematic diagram of I/O request scheduling from a virtual file system to a block level in one or more embodiments of the present disclosure.

FIG. 8 illustrates a schematic diagram of I/O request scheduling from a virtual file system to a block level in one or more embodiments of the present disclosure.

Referring to FIG. 8, according to one or more embodiments of the present disclosure, in a VFS, a quantity threshold value for a readahead request to be scheduled to a block layer among I/O requests generated by user data processed by a user space application and a kernel thread may be adjusted by dynamic readahead, and a limited number of readahead requests pass through the file system and then are submitted to the block layer. The I/O requests submitted to the block layer may have different priorities, and a queue monitor of the block layer may monitor the number and size of each type of request dispatched and pending.

According to one or more embodiments of the present disclosure, the scheduling the I/O request in the request queue scheduled from the virtual file system to the block layer based on the adjusted first preset threshold value may further include the operations of: scheduling I/O requests scheduled from the virtual file system to the block layer based on the adjusted first preset threshold value; dispatching the I/O requests scheduled to the block layer to an asynchronous queue and a synchronous queue under a corresponding task, wherein a request type dispatched to the synchronous queue includes a synchronous request and a readahead request, and a request type dispatched to the asynchronous queue includes an asynchronous write request; allocating corresponding priorities to the synchronous queue and the asynchronous queue, wherein the synchronous queue has a higher priority than the asynchronous queue; scheduling the I/O requests in the synchronous queue and the asynchronous queue to the request queue of the block layer based on the allocated priorities.

According to one or more embodiments of the present disclosure, I/O requests may be categorized to differentiate asynchronous requests and synchronous requests for each task in the block layer, and to facilitate ensuring a priority allocated to a command queue thereof. Specifically, the I/O requests scheduled to the block layer may be dispatched to the asynchronous queue and the synchronous queue under the corresponding task, respectively, and the synchronous queue may be used to store a synchronous type of request such as a synchronous request, a readahead request, etc., and the asynchronous queue may be used to store an asynchronous type of request such as an asynchronous write request, so that the requests such as readahead and synchronous read/write may be dispatched to the synchronous queue of each task, and the asynchronous write request is dispatched to the asynchronous queue. At this point, corresponding priorities may be allocated to the synchronous queue and the asynchronous queue, so that the synchronous queue has a higher priority than the asynchronous queue; finally, the I/O requests of the synchronous queue and the asynchronous queue may be scheduled sequentially in accordance with the allocated priorities.

According to one or more embodiments of the present disclosure, in the synchronous queue, the synchronous request may have a higher priority than the readahead request.

According to one or more embodiments of the present disclosure, in the process of scheduling the I/O requests in accordance with the priorities allocated to the synchronous queue and the asynchronous queue, corresponding priorities may be further allocated to the synchronous request and the readahead request dispatched in the synchronous queue, so that the priority of the synchronous request is higher than that of the readahead request, and thus, the synchronous request, the readahead request, and the asynchronous request may be scheduled sequentially according to the allocated priorities.

According to one or more embodiments of the present disclosure, the synchronous request, the asynchronous request, and the readahead request may be identified and distinguished by marking. Since different read requests may be distinguished in the block layer when scheduling the I/O requests, the priority of the readahead request may be set lower than the priority of the synchronous I/O request.

According to one or more embodiments of the present disclosure, the above method for scheduling I/O requests may further include, but is not limited to, the operation of: adjusting a second preset threshold value and/or a third preset threshold value based on the information of the currently pending I/O request, wherein the second preset threshold value is a quantity threshold value for a readahead request scheduled in the block layer, and the third preset threshold value is a quantity threshold value for an asynchronous write request scheduled in the block layer; scheduling a readahead request to be scheduled in the block layer and/or an asynchronous write request to be scheduled in the block layer based on the adjusted second preset threshold value and/or third preset threshold value.

According to one or more embodiments of the present disclosure, a queue monitor in the block layer may track the number and size of pending requests in a host-level request queue, and the multi-queue in the block layer (e.g., host-level request queue) may adjust the number of I/O requests to be scheduled by a queue monitor function of the queue monitor. Thus, based on the information of the currently pending I/O request, the quantity threshold value for the readahead request to be scheduled in the block layer may be adjusted, and/or, the quantity threshold value for the asynchronous write request to be scheduled in the block layer may be adjusted, e.g., the second preset threshold value and/or the third preset threshold value may be adjusted; and finally, the I/O requests may be scheduled based on the adjusted quantity threshold value(s) for the readahead request and/or the asynchronous write request are scheduled.

According to one or more embodiments of the present disclosure, limited readahead may be realized by limiting the number of readahead requests to be scheduled by the second preset threshold value, and limited write may be realized by limiting the number of asynchronous write requests to be scheduled by the third preset threshold value. These features enable the block layer to dynamically adjust the number of readahead requests and asynchronous write requests to be scheduled based on states of the synchronous request and other types of requests in the current queue by means of limited readahead and limited write, in order to limit task execution resources such as storage bandwidth to I/O requests of types that have a higher update frequency and/or read frequency or that more affect the user experience. In this regard, the dynamic adjustment of the number of readhead requests and asynchronous write requests acts as a limit on a number of requests that adversely affect the user experience.

According to one or more embodiments of the present disclosure, limited readahead and limited write operations may implement a function of a command-aware queue. Limited readahead and limited write operations may be used to limit readahead and asynchronous write requests transmitted to the command queue when, for example, the synchronous request is expected to arrive. In order to limit the number of readahead and asynchronous write requests, limited readahead and limited write operations may be performed in two phases. Furthermore, limited write may be used to address read/write interference to reduce asynchronous write requests, and ensure that a write operation is in progress, while other read or write operations are blocked, e.g., limited write may also limit the number of asynchronous write requests based on the number of readahead requests.

According to one or more embodiments of the present disclosure, the limitation on the number of readahead requests and asynchronous write requests may actually also prevent priority reverse of device-level scheduling.

According to one or more embodiments of the present disclosure, the block layer may actually add two modules of limited readahead and limited write operations, to schedule I/O requests, and thus, to schedule the block queue. In one or more examples, any one of limited readahead and limited write operations may be added, and the present disclosure is not limited thereto. The limited readahead operation may be used to adjust the number of readahead requests dispatched to the block queue (e.g., block layer multi-queue), and the limited write operation may be used to adjust the number of synchronous write requests allocated to the block queue.

According to one or more embodiments of the present disclosure, a host-level I/O scheduler may start/stop one or more of dynamic readahead, limited readahead, and limited write modules, either on command or automatically, in order to use the I/O scheduling technique or primitive scheduling mechanism of exemplary embodiments of the present disclosure.

Figure 9:
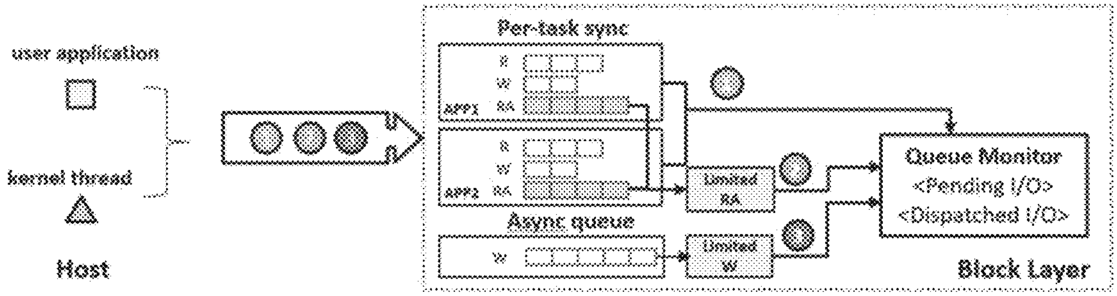
FIG. 9 illustrates a schematic diagram of I/O request scheduling at a block layer in one or more embodiments of the present disclosure.

FIG. 9 illustrates a schematic diagram of I/O request scheduling at a block layer in one or more embodiments of the present disclosure.

Referring to FIG. 9, according to one or more embodiments of the present disclosure, an I/O request from a user application and/or a kernel thread in a host may be scheduled to a block layer after a default sorting. In the block layer, synchronous and asynchronous requests may first be distinguished from each other to dispatch synchronous and asynchronous requests to a synchronous queue and an asynchronous queue, respectively. The synchronous queue may be a queue differentiated based on each task, and each task may correspond to each different application separately. A synchronous read request, a synchronous write request, a readahead request, etc., may be dispatched to the synchronous queue under each task, and an asynchronous write request, etc., may be dispatched to the asynchronous queue. The highest priority may be allocated to the synchronous read/write request for each task in the synchronous queue, then a medium priority may be allocated to the readahead request in each task, and finally, the lowest priority may be allocated to the request in the asynchronous queue. As shown in FIG. 9, the priority order may be ①>②>③. The quantity threshold value for the readahead request scheduled in the block layer may be limited by the limited readahead operation, and the quantity threshold value for the asynchronous write request scheduled in the block layer may be limited by the limited write operation. A queue monitor in the block layer may monitor types, numbers, and other states of pending I/O requests as well as I/O requests that have been dispatched, and may adjust the number of I/O requests to be scheduled based on functions such as limited readahead, limited write, and the like.

According to one or more embodiments of the present disclosure, in the process of adjusting the second preset threshold value and/or the third preset threshold value, the sum of the second preset threshold value and the third preset threshold value may be adjusted, in the case where the currently pending I/O request does not include a synchronous request, to the maximum length of the request queue that can be efficiently managed and processed by the storage system or the I/O controller.

According to one or more embodiments of the present disclosure, when there is no synchronous request in a scheduler queue, a total pending size of the readahead request and the asynchronous write request may be limited to θmax, where θmax may represent a maximum processable size of a valid command queuing.

In one or more examples, the scheduler queue may refer to a queue of processes or tasks waiting for the operating system scheduler to be scheduled. When a process or task transitions from a running state to a ready state, it may be placed in the scheduler queue waiting to be allocated by the scheduler. The scheduler may schedule these ready processes and allocate them to available processors to run according to a certain priority or scheduling algorithm.

In one or more examples, the maximum processable size of valid command queuing may refer to a maximum length of the I/O operation request queue that may be efficiently managed and processed by the storage system or the I/O controller. This index may measure the number of I/O requests that an I/O system can handle simultaneously without reducing efficiency. It may reflect the concurrent processing capability of the I/O system.

In one or more examples, when the present disclosure refers to a size of a request, the present disclosure may refer to a storage space, an execution resource, etc., or it may refer to the number of requests, etc.

According to one or more embodiments of the present disclosure, in the process of adjusting the second preset threshold value and/or the third preset threshold value based on the information of the currently pending I/O request, the sum of the second preset threshold value and the third preset threshold value may be decreased in the case where the synchronous request is detected to be included in the currently pending I/O request.

According to one or more embodiments of the present disclosure, if there are one or more synchronous requests in the host-level scheduler queue, a more aggressive request limitation strategy may be performed. For example, a maximum suspend size of the readahead request and the asynchronous write request may be limited to θmin (θmin<θmax).

According to one or more embodiments of the present disclosure, by using block-level I/O scheduling with the limited readahead operation, limited write operation, and dynamic readahead, priority reverse and read/write interference may be prevented, with superior performance and lower I/O latency than scheduling procedures that are primarily the CFQ algorithm only.

According to one or more embodiments of the present disclosure, the above method for scheduling an I/O request may further include, but is not limited to, the operations of: dispatching I/O requests scheduled to an I/O controller to a plurality of request queues corresponding to request types, respectively; allocating corresponding weights to respective request queues in the plurality of request queues based on the request types that the respective request queues are respectively dispatched; determining a write order corresponding to respective request queues based on the weights allocated to the respective request queues; sequentially writing the I/O requests dispatched to the respective request queues to a storage system based on the write order corresponding to the respective request queues.

According to one or more embodiments of the present disclosure, weighted round-robin (WRR) arbitration may be implemented in a storage device, specifically, in performing a scheduling process of I/O requests, I/O requests scheduled to the I/O controller may be dispatched to a plurality of request queues corresponding to request types, respectively, in order to more flexibly process the I/O requests; corresponding weights may be allocated to the respective request queues in the plurality of request queues based on the request types dispatched to the respective request queues, and the weights may be calculated by a WRR weight calculator, such that the command queue (multi-queue) in the block layer corresponds to the queue of the WRR by the WRR weight calculator; the I/O requests dispatched to the respective request queues may be written to the storage system sequentially based on the write order corresponding to the weights allocated to the respective request queues.

According to one or more embodiments of the present disclosure, the device controller may enable or disable the WRR function. Depending on the WRR strategy, the WRR weight calculator may allocate a weight to an I/O request for each queue, or the WRR weight calculator may allocate queue weights to the request queues for the host-level I/Q, or the WRR weight calculator may fetch requests from the host and allocate priority queue weights to each I/O, which may be mapped to the corresponding priority queues after the weights are allocated. Multiple WRR queue priorities may be defined to dynamically allocate weighted priority queues to the TW buffer based on the queue priorities to accomplish device-level WRR scheduling.

According to one or more embodiments of the present disclosure, the limitation on the number of readahead requests and asynchronous write requests may actually be combined with WRR to better prevent priority reverse for device-level scheduling.

According to one or more embodiments of the present disclosure, the weights allocated to the respective request queues are used to prioritize writing an I/O request of a type of a higher update frequency and/or read frequency.

According to one or more embodiments of the present disclosure, a higher weight may be allocated to an I/O request with a type of a higher update frequency and/or read frequency, e.g., a synchronous request, etc., and I/O request scheduling may be performed in conjunction with a strategy of high weight priority write.

According to one or more embodiments of the present disclosure, the sequentially writing the I/O requests dispatched to the respective request queues to the corresponding buffer in the storage system based on the write order corresponding to the respective request queues may include, but is not limited to: sequentially writing a synchronous read request and/or a read request from a foreground application, a synchronous write request, a readahead request, and an asynchronous request from a background application to the corresponding buffer in the storage system.

According to one or more embodiments of the present disclosure, the types that have a higher update frequency and/or read frequency or more affect the user experience may be, in order, the synchronous read request and/or the read request from the foreground application, the synchronous write request, the readahead request, and the asynchronous request from the background application. Accordingly, these requests may be sequentially allocated a weight in descending order to be written to the storage device in the order listed above. Of course, other conforming write orders are possible.

According to one or more embodiments of the present disclosure, the sequentially writing the I/O requests dispatched to the respective request queues to the storage system based on the write order corresponding to the respective request queues may include, but is not limited to, the operations of: acquiring ratios between different levels of weights in the weights of the respective request queues, and adjusting the weights of the respective request queues based on a preset range of ratios, wherein the weights of the respective request queues are divided into a plurality of levels according to a weight value; and writing, to the storage system, the I/O requests dispatched to the respective request queues based on the adjusted weights of the respective request queues.

According to one or more embodiments of the present disclosure, in the above process of sequentially writing the I/O requests dispatched to the respective request queues to the storage system based on the write order corresponding to the respective request queues, the ratios between different levels of weights in the weights of the respective request queues may be obtained, for example, a ratio between weights of two levels of high and low, and of course, a variety of other levels, may also be obtained. Then, the weights of the respective request queues may be adjusted according to the preset range of ratios, for example, the preset range of ratios may indicate that the ratio between the weights of the two levels of high and low does not exceed a minimum value and is not greater than a maximum value, and of course, may be a variety of other ranges of ratios; and the dispatched I/O requests in the respective request queues may be written to the storage system based on the adjusted weights of the respective request queues.

According to one or more embodiments of the present disclosure, a function of adjusting a weight of an I/O request based on a weight ratio of current I/O requests may be realized by the WRR scheduler, specifically, for example, the WRR scheduler may be used to adjust the queue weights by means of a HL ratio ((High Weight)/(Low Weight)=HL ratio) to dynamically adjust the respective ratios of high/low weights. Specifically, High Weight may denote the number or required size of execution resources of requests with high-level weights, Low Weight may denote the number or required size of execution resources of requests with low-level weights. When the HL ratio is too high, the too low weight of the I/O request in the low priority queue may cause the TW buffer to be congested and thus, lead to longer latency, and when the HL ratio is too low, the weight of the high priority queue may not be sufficient to meet the requirements such as storage bandwidth utilization. Thus, the actual HL ratio may be maintained in a more desirable preset ratio range by adjustment.

According to one or more embodiments of the present disclosure, the use of the WRR strategy instead of the RR strategy may ensure the scheduling priority of the I/O requests, and therefore the I/O latency is lower.

According to one or more embodiments of the present disclosure, device-level scheduling may select a scheduling strategy, such as single-queue scheduling, MCQ RR scheduling, or MCQ WRR scheduling either on command or automatically.

According to one or more embodiments of the present disclosure, the device controller may use WRR scheduling with two and more functions, such as WRR scheduling which can adjust the HL ratio and WRR scheduling of fix weights.

According to one or more embodiments of the present disclosure, the sequentially writing the I/O requests dispatched to the respective request queues to the storage system based on the write order corresponding to the respective request queues may include, but is not limited to, the operations of: sequentially writing the I/O requests dispatched to the respective request queues to a corresponding buffer in the storage system based on the write order corresponding to the respective request queues.

According to one or more embodiments of the present disclosure, during the process of writing data to the device memory by the device controller, when the storage device may support the Turbo Write 2.1 technology, the WRR scheduler may intelligently write each I/O request to the TW buffer according to the priority queue weight of each I/O request and its I/O type and category, or it may write each I/O request to the TW buffer only according to the priority queue to ensure that a high-priority request is prioritized to be written to the TW buffer, or to ensure that frequently updated and read data is prioritized to be written to the TW buffer.

For example, a request from the foreground application, a readahead request, and a request from the background application may be written to the pinning TW and the normal TW in order based on weight and quantity, and lower priority queues may be written directly to the normal storage. For another example, a synchronous read/write request generated by the foreground application may be written to the pinning TW and the normal TW in priority according to its weight, and when there is no synchronous request generated by the foreground application or the number of foreground synchronous requests is low, the readahead request and the synchronous request generated by the background application may be written to the pinning TW and the normal TW in order according to their weights, which allows for a higher write performance and buffer utilization.

According to one or more embodiments of the present disclosure, the above method for scheduling an I/O request may further include, but is not limited to, the operation of: resizing the corresponding buffer in the storage system based on the weights allocated to the respective request queues and the number of the request queues.

According to one or more embodiments of the present disclosure, the TW buffer may be dynamically resized based on the priority and number of request queues and the size of the TW buffer may be pinned.

Figure 10:
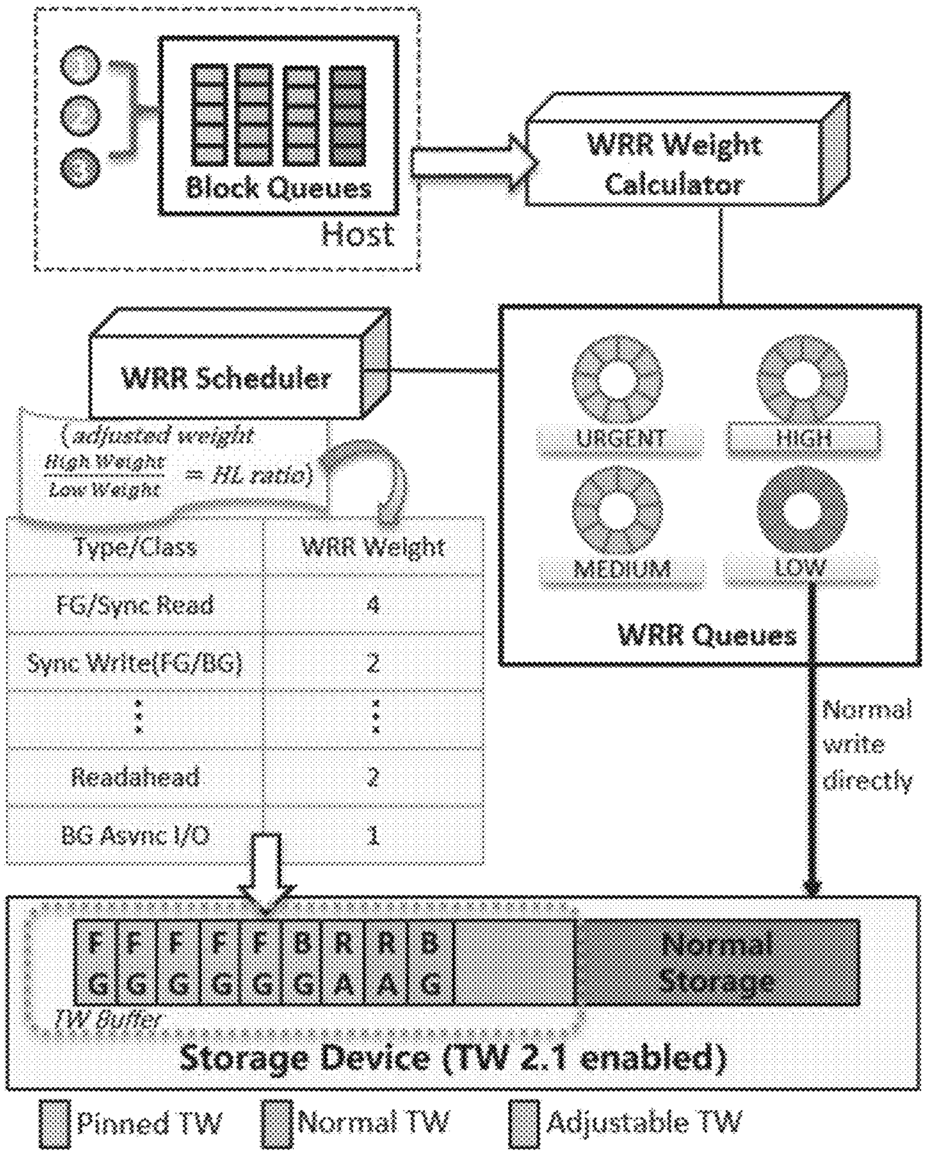
FIG. 10 illustrates a schematic diagram of I/O request scheduling during a process in which a device controller writes data to a device memory in one or more embodiments of the present disclosure.

FIG. 10 illustrates a schematic diagram of I/O request scheduling during a process in which a device controller writes data to a device memory in one or more embodiments of the present disclosure.

Referring to FIG. 10, according to one or more embodiments of the present disclosure, a block layer in a host may make a preliminary determination of a priority of an I/O request by means of a multi-queue, and then, the multi-queue of the block layer may be mapped to a priority queue (WRR multi-queue) of a device controller by a WRR weight calculator, and at this time, the queue priority may be classified into four types, for example, urgent, high, medium, and low, and a request in a low-priority queue may be directly written to a normal storage area in a storage device by a normal write manner without first writing to a TW buffer. A request in a high-priority queue may be written to a pinning area, a normal area, and an adjustable area of the TW buffer sequentially according to the highest to lowest priority. Moreover, a weight of the priority queue may be adjusted by a WRR scheduler. For example, types and categories of requests are arranged in an order from high to low according to corresponding weights as follows: a synchronous read request from a foreground application, a synchronous write request from the foreground/background application, a readahead request, and an asynchronous request from the background application. At this time, the respective requests may be written into the TW buffer sequentially according to the above order, and at the same time, it is also possible to regard the first two weight levels as high weights and the last two weight levels as low weights, thereby calculating a HL ratio and adjusting the respective weights according to the HL ratio.

Figure 11:
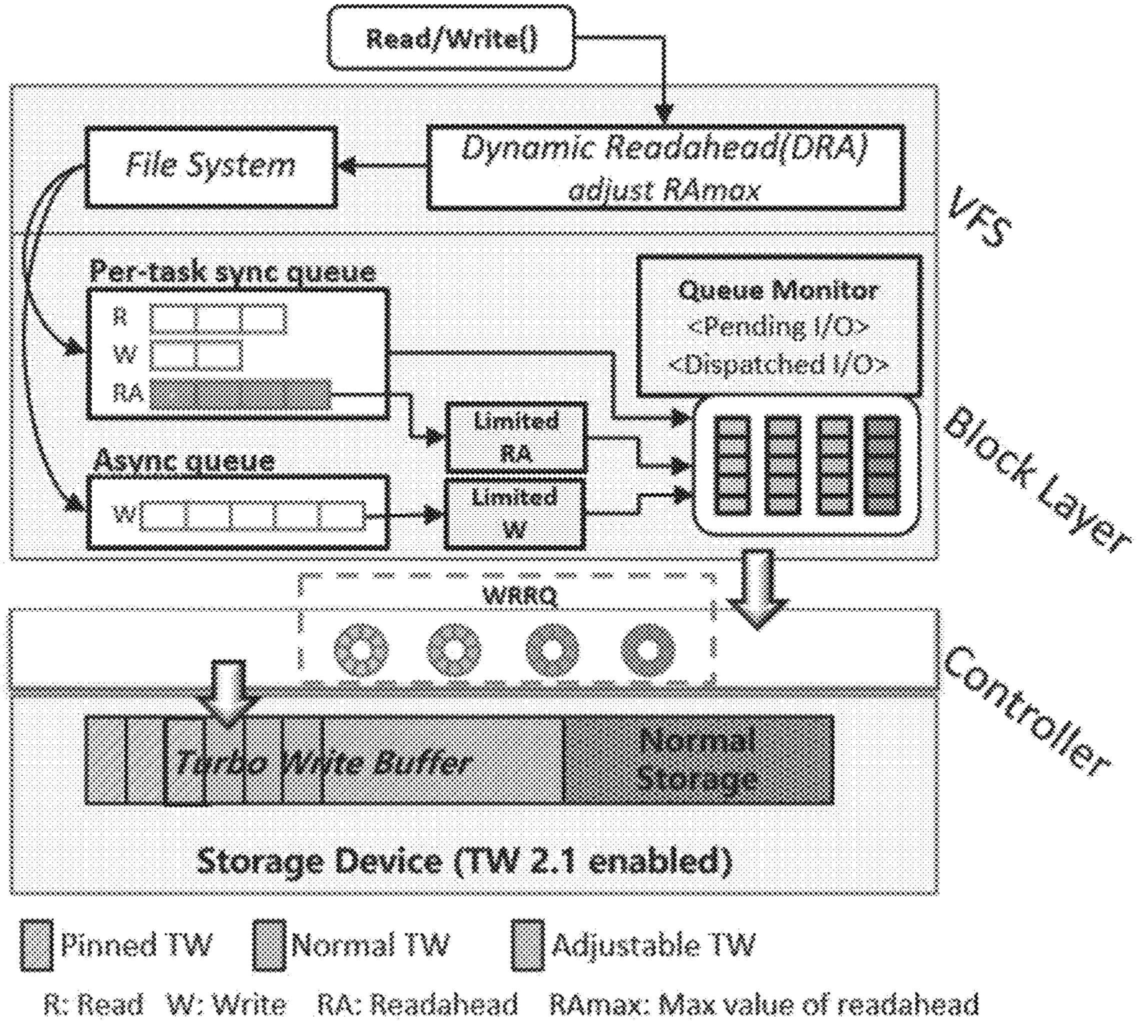
FIG. 11 illustrates a flow diagram of a method for scheduling I/O request in one or more embodiments of the present disclosure.

FIG. 11 illustrates a flow diagram of a method for scheduling I/O request in one or more embodiments of the present disclosure.

Referring to FIG. 11, according to one or more embodiments of the present disclosure, when an I/O request, e.g., a read/write request, is received by a VFS, a quantity threshold value for a readahead request scheduled from the VFS to a block layer may be adjusted by dynamic readahead, and the I/O request is scheduled through a file system to the block layer and is allocated to an asynchronous queue or to a synchronous queue under each task depending on a type of the request. The number of readahead requests and asynchronous write requests to be scheduled may be limited in the block layer by limited readahead and limited write operations. The requests may then be sequentially scheduled into the block layer multi-queue 1101 based on a priority corresponding to the type of each request. A queue monitor in the block layer may monitor I/O requests to be processed and I/O requests that have been dispatched, and may adjust the number of I/O requests to be scheduled based on the functions such as limited readahead and limited write. Finally, in a case where a storage device supports a Turbo Write 2.1 technology, an I/O controller may map a multi-queue in the block layer to a priority queue (WRR queue) of the I/O controller by a WRR strategy, and write I/O requests in the priority queue sequentially according to the highest to lowest priority to a pinning area, a normal area, an adjustable area of a TW buffer of the storage device, and a normal storage area of the storage device.

Figure 12:
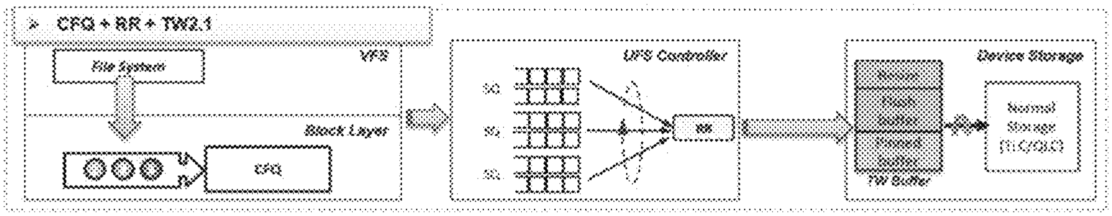
FIGS. 12(*a*)-(*b*) illustrate a comparison diagram between a method for scheduling I/O requests and a method for scheduling I/O request in one or more embodiments of the present disclosure.
Figure 12:
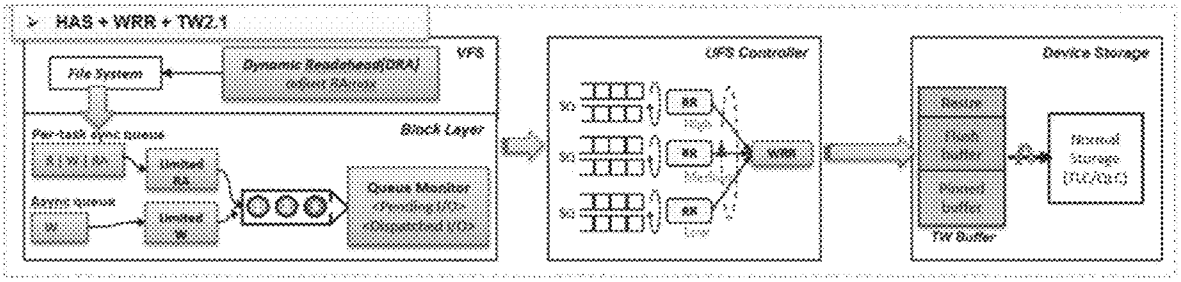

FIGS. 12(*a*)-(*b*) illustrate a comparison diagram between a method for scheduling I/O requests and a method for scheduling I/O request in one or more embodiments of the present disclosure.

Referring to FIG. 12(*a*), I/O request scheduling may be performed in a method of CFQ+RR+TW2.1. For example, a VFS may schedule a received I/O request directly from a file system to a block layer, the I/O request may be sorted out according to a default priority and a CFQ algorithm and scheduled to a SQ of a UFS controller, and then requested data may be written to a storage device containing a TW sequentially according to a RR strategy, and reading the data is performed by a conventional method.

Referring FIG. 12(*b*), according to one or more embodiments of the present disclosure, the I/O request scheduling may be performed in a method of HAS+WRR+TW2.1. For example, a quantity threshold value for a readahead request scheduled to the block layer via the file system may be adjusted at the VFS by dynamic readahead, and further differentiation is made between request types and between an asynchronous request queue and a synchronous request queue corresponding to each task at the block layer, so as to dispatch the I/O request to either the asynchronous request queue or the synchronous request queue under the corresponding task. The synchronous request queue under each task may store a synchronous read/write request and a readahead request, and the asynchronous request queue may store an asynchronous write request. Then, the I/O scheduling may be performed in combination with limited readahead and limited write according to a priority corresponding to each request type in the synchronous request queue and the asynchronous request queue, and a queue monitor in the block layer may monitor a pending I/O request and an I/O requests that has already been dispatched, and may adjust the number of I/O requests to be scheduled according to the limited readahead operation, limited write operation, and the like. After scheduling the I/O request into the SQ of the UFS controller, the SQ may be further allocated a corresponding weight to realize intelligent writing and faster reading of data of the I/O request to the storage device containing the TW through a WRR strategy based on the allocated weight. HAS+WRR may reduce the urgent I/O latency without affecting the overall performance by changing the priority of the I/O processing. WRR+TW2.1 may dynamically allocate the TW buffer based on priority to improve performance and reduce I/O latency.

Figure 13:
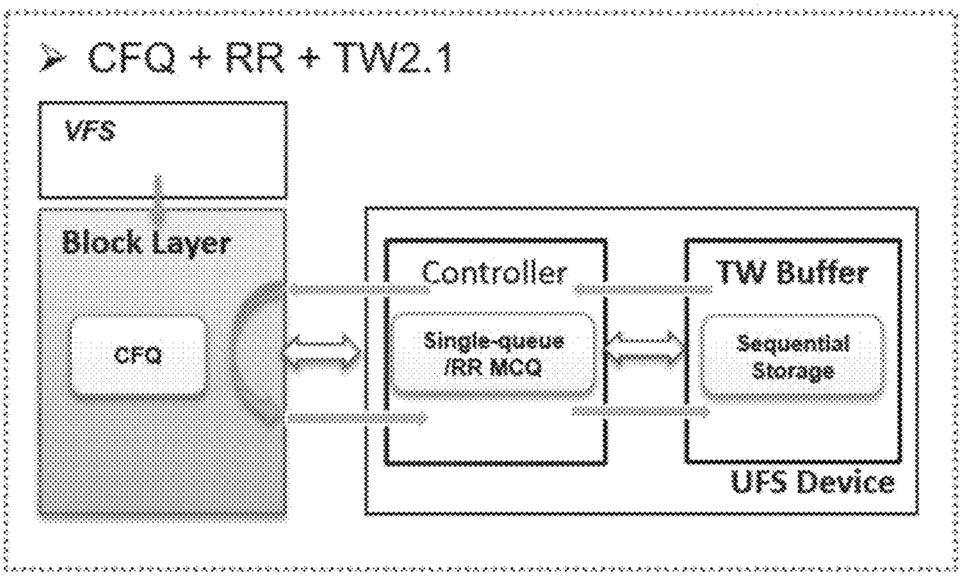
FIGS. 13(*a*)-(*b*) illustrate a simplified comparison diagram between a method for scheduling I/O request and a method for scheduling I/O request in one or more embodiments of the present disclosure.
Figure 13:
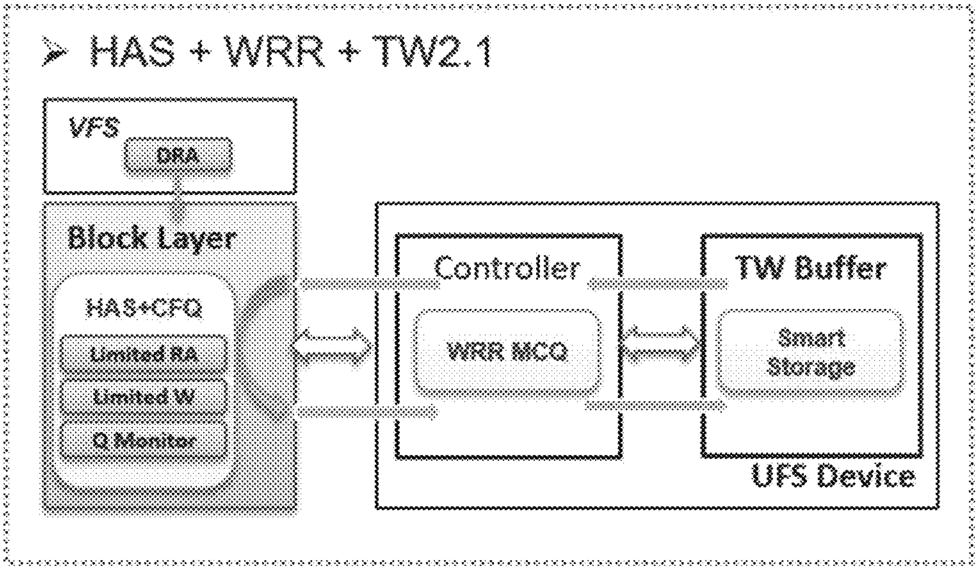

FIGS. 13(*a*)-(*b*) illustrate a simplified comparison diagram between a method for scheduling I/O request and a method for scheduling I/O request in one or more embodiments of the present disclosure.

Referring to FIG. 13(*a*), I/O request scheduling may be performed using a method of CFQ+RR+TW2.1. Specifically, a VFS may schedule a received I/O request directly to a block layer, the I/O request may be scheduled to a controller of a UFS device based on a CFQ algorithm in the block layer, and the I/O request may be further written, by means of sequentially storing, to a TW buffer by a single-queue or RR MCQ strategy in the controller.

Referring to FIG. 13(*b*), according to one or more embodiments of the present disclosure, the I/O request scheduling may be performed using a method of HAS+WRR+TW2.1. Specifically, a quantity threshold value for a readahead request to be allocated to the block layer may be adjusted at the VFS by Dynamic Readahead (DRA), and a combination of host-level aware scheduling (HAS) and a CFQ scheduling algorithm may be implemented at the block layer by one or more mechanisms, such as limited readahead, limited write, queue monitor, and so on, in order to allocate the I/O request to the UFS device, and the controller of the UFS device may implement weighted round-robin (WRR) arbitration and combine it with a Multiple Command Queue (MCQ) to further intelligently write the request to the TW buffer of the UFS device for intelligent storage.

According to one or more embodiments of the present disclosure, a data interaction with respect to I/O request scheduling may be performed between the block layer and the controller of the UFS device, and between the controller of the UFS device and the TW buffer, rather than just a one-way data transmission. For example, data interactions such as issuance of an I/O request, transmission of a command and data, and return of a state and corresponding data may be performed between the block layer and the controller of the UFS device; data interactions such as storage and acquisition of task data corresponding to the I/O request, and management of a task state may be performed between the controller of the UFS device and the TW buffer.

It is to be understood that the controller, the device controller, the I/O controller, and the UFS controller mentioned in the exemplary embodiments of the present disclosure may be corresponding or identical functional modules.

According to exemplary embodiments of the present disclosure, in order to optimize the I/O latency and improve the utilization of the TW buffer, modified host-level aware scheduling (HAS), weighted round-robin (WRR) arbitration, and Turbo Write 2.1 (TW2.1) supported by the UFS device may be used to prevent priority reverse and read/write interference.

Figure 14:
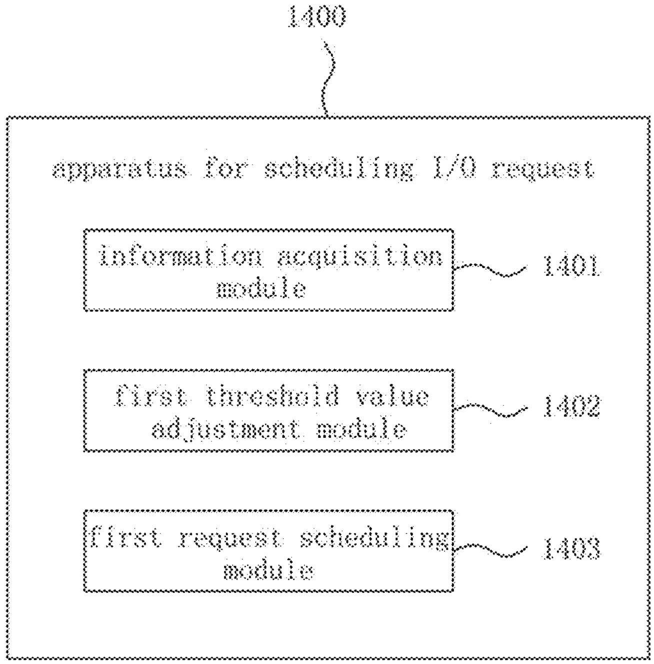
FIG. 14 illustrates a block diagram of an apparatus for scheduling I/O request of one or more embodiments of the present disclosure.

FIG. 14 illustrates a block diagram of an apparatus for scheduling I/O request of one or more embodiments of the present disclosure.

Referring to FIG. 14, the exemplary embodiment of the present disclosure also provides an apparatus 1400 for scheduling I/O request that may include, but is not limited to, an information acquisition module 1401, a first threshold value adjustment module 1402, and a first request scheduling module 1403.

In one or more examples, the information acquisition module 1401 may acquire information of a currently pending I/O request, wherein the currently pending I/O request may include an I/O request suspended in a current command queue and/or request queue, and the information of the currently pending I/O request may include a request type contained in the currently pending I/O request.

In one or more examples, the first threshold value adjustment module 1402 may adjust a first preset threshold value based on the acquired information of the currently pending I/O request, wherein the first preset threshold value is a quantity threshold value for a readahead request among an I/O request in a request queue scheduled from a virtual file system to a block layer.

In one or more examples, the first request scheduling module 1403 may schedule the I/O request in the request queue scheduled from the virtual file system to the block layer based on the adjusted first preset threshold value.

According to one or more embodiments of the present disclosure, the first request scheduling module 1403 may: schedule I/O requests scheduled from the virtual file system to the block layer based on the adjusted first preset threshold value; dispatch the I/O requests scheduled to the block layer to an asynchronous queue and a synchronous queue under a corresponding task, wherein a request type dispatched to the synchronous queue may include, but is not limited to, a synchronous request and a readahead request, and a request type dispatched to the asynchronous queue may include, but is not limited to, an asynchronous write request; allocate corresponding priorities to the synchronous queue and the asynchronous queue, wherein the synchronous queue has a higher priority than the asynchronous queue; schedule the I/O requests in the synchronous queue and the asynchronous queue to the request queue of the block layer based on the allocated priorities.

According to one or more embodiments of the present disclosure, in the synchronous queue, the synchronous request may have a higher priority than the readahead request.

According to one or more embodiments of the present disclosure, the apparatus may further include, but is not limited to, a second threshold value adjustment module (not shown) which may be configured to adjust a second preset threshold value and/or a third preset threshold value based on the information of the currently pending I/O request, wherein the second preset threshold value is a quantity threshold value for a readahead request scheduled in the block layer, and the third preset threshold value is a quantity threshold value for an asynchronous write request scheduled in the block layer; and a third request scheduling module (not shown) which may be configured to schedule a readahead request to be scheduled in the block layer and/or an asynchronous write request to be scheduled in the block layer based on the adjusted second preset threshold value and/or third preset threshold value.

According to one or more embodiments of the present disclosure, the third request scheduling module may adjust a sum of the second preset threshold value and the third preset threshold value to a maximum length of a request queue that can be efficiently managed and processed by a storage system or an I/O controller, in a case where the currently pending I/O request does not contain a synchronous request.

According to one or more embodiments of the present disclosure, the third request scheduling module may decrease a sum of the second preset threshold value and the third preset threshold value in a case where the currently pending I/O request contains a synchronous request.

According to one or more embodiments of the present disclosure, the apparatus 1400 further may include, but is not limited to, a second request dispatch module (not shown) which may dispatch I/O requests scheduled to an I/O controller to a plurality of request queues corresponding to request types, respectively; a weight allocation module (not shown) which may allocate corresponding weights to respective request queues in the plurality of request queues based on the request types that the respective request queues are respectively dispatched; an order determination module (not shown) which may determine a write order corresponding to respective request queues based on the weights allocated to the respective request queues; and a request write module (not shown) which may sequentially write the I/O requests dispatched to the respective request queues to a storage system based on the write order corresponding to the respective request queues.

According to one or more embodiments of the present disclosure, the request write module may acquire ratios between different levels of weights in the weights of the respective request queues, and adjust the weights of the respective request queues based on a preset range of ratios, wherein the weights of the respective request queues are divided into a plurality of levels according to a weight value; write, to the storage system, the I/O requests dispatched to the respective request queues based on the adjusted weights of the respective request queues.

According to one or more embodiments of the present disclosure, the request write module may sequentially write the I/O requests dispatched to the respective request queues to a corresponding buffer in the storage system based on the write order corresponding to the respective request queues.

According to one or more embodiments of the present disclosure, the apparatus 1400 further may include, but is not limited to, a buffer resizing module (not shown) which may resize the corresponding buffer in the storage system based on the weights allocated to the respective request queues and the number of the request queues.

According to one or more embodiments of the present disclosure, the weights allocated to the respective request queues are used to prioritize writing an I/O request with a type of a higher update frequency and/or read frequency.

According to one or more embodiments of the present disclosure, the request write module may sequentially write, to the corresponding buffer in the storage system, a synchronous read request and/or a read request from a foreground application, a synchronous write request, a readahead request, and an asynchronous request from a background application.

According to one or more embodiments of the present disclosure, the first threshold value adjustment module may decrease or maintain the first preset threshold value in a case where the currently pending I/O request includes a synchronous request; and/or increase the first preset threshold value in a case where the currently pending I/O request includes at least a preset number of asynchronous write requests, wherein the information of the currently pending I/O request further may include, but is not limited to, a number of asynchronous write requests in the currently pending I/O request.

It may be understood that the specific implementation process in the above exemplary embodiment of the apparatus 1400 for scheduling I/O request is substantially the same as that in the above exemplary embodiment of the method for scheduling I/O request, and will not be described repeatedly herein. The apparatus 1400 for scheduling I/O request may be configured as software, hardware, firmware, or any combination of the foregoing items for performing specific functions, respectively. For example, these apparatus may correspond to dedicated integrated circuits, or to pure software codes, or to modules that combines software and hardware. In addition, one or more of the functions implemented by these apparatuses may also be uniformly performed by components in a physical entity device (e.g., a processor, client, or server, etc.). In one or more examples, each of module illustrated in FIG. 14 may be implemented by one or more processors.

Figure 15:
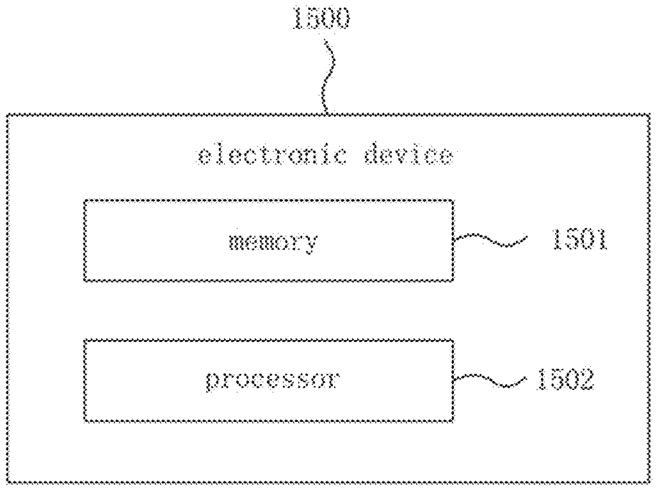
FIG. 15 is a block diagram of an electronic device according to one or more embodiments of the present application.

FIG. 15 is a block diagram of an electronic device according to one or more embodiments of the present application.

Referring to FIG. 15, an electronic device 1500 includes at least one memory 1501 and at least one processor 1502, the at least one memory 1501 stores a computer-executable instruction set, when the computer-executable instruction set is executed by the at least one processor 1502, a method for scheduling I/O request according to one or more embodiments of the present application is performed.

As an example, the electronic device 1500 may be a PC computer, a tablet apparatus, a personal digital assistant, a smart phone, or any other apparatus capable of executing the above instruction set. Here, the electronic device 1500 does not have to be a single electronic device, but may also be any set of apparatuses or circuits capable of executing the above instructions (or instruction set) individually or jointly. The electronic device 1500 may also be a part of an integrated control system or system manager, or may be configured as a portable electronic device that interfaces locally or remotely (e.g., via wireless transmission).

In electronic device 1500, the processor 1502 may include central processing units (CPUs), graphics processing units (GPUs), programmable logic apparatuses, special purpose processor systems, microcontrollers or microprocessors. By way of example and not limitation, the processor may also include analog processors, digital processors, microprocessors, multi-core processors, processor arrays, network processors, and the like.

The processor 1502 may execute instructions or code stored in the memory 1501, which may also store data. Instructions and data may also be transmitted and received over a network via a network interface apparatus, which may employ any known transport protocol.

The memory 1501 may be integrated with the processor 1502, e.g., a RAM or flash memory is arranged within an integrated circuit microprocessor or the like. Additionally, the memory 1501 may include a separate apparatus such as an external disk drive, storage array, or any other storage device that may be used by a database system. The memory 1501 and the processor 1502 may be operatively coupled, or may communicate with each other, e.g., through I/O ports, network connections, etc., to enable the processor 1502 to read files stored in the memory.

In addition, the electronic device 1500 may also include a video display (e.g., a liquid crystal display) and a user interaction interface (e.g., a keyboard, mouse, touch input device, etc.). All components of electronic device 1500 may be connected to each other via a bus and/or network.

Figure 16:
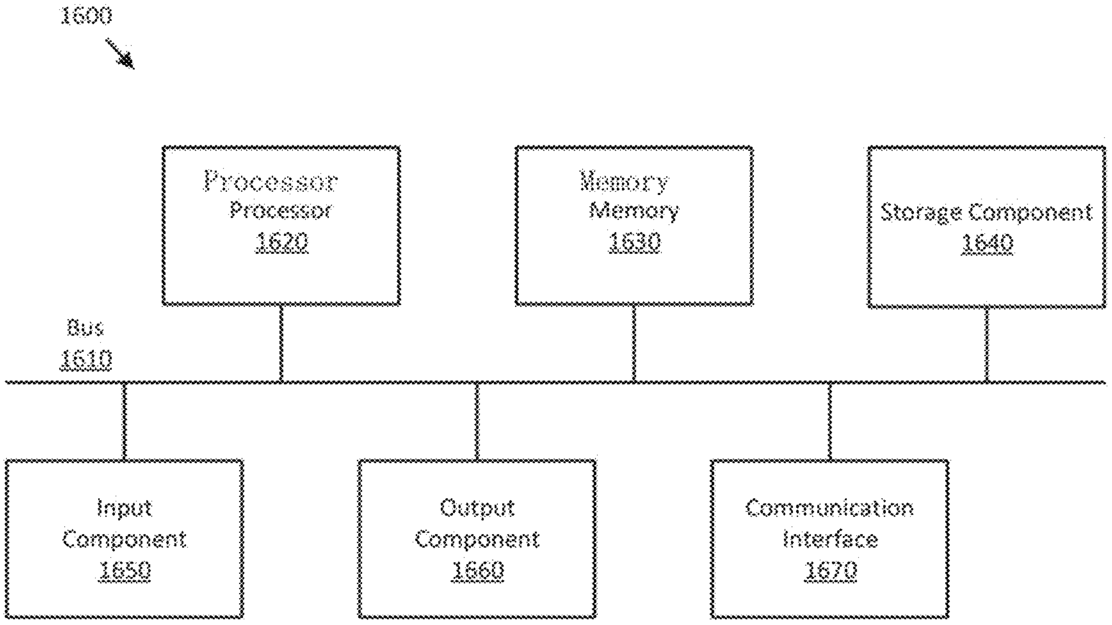
FIG. 16 is a block diagram of an example computer system, in accordance with embodiments of the present disclosure.

FIG. 16 is a block diagram of example components of one or more devices of FIG. 1. The device 1600 may correspond to the user device 110 and/or the platform 1160. The device 1600 may be any other suitable device such as a TV, wall panel, etc. As shown in FIG. 16, the device 1600 may include a bus 1610, a processor 1620, a memory 1630, a storage component 1640, an input component 1650, an output component 1660, and a communication interface 1670.

The bus 1610 includes a component that permits communication among the components of the device 1600. The processor 1620 is implemented in hardware, firmware, or a combination of hardware and software. The processor 1620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 1620 includes one or more processors capable of being programmed to perform a function. The memory 1630 includes a random access memory (RAM), a read only memory (ROM), and/or another type of dynamic or static storage device (e.g. a flash memory, a magnetic memory, and/or an optical memory) that stores information and/or instructions for use by the processor 1620.

The storage component 1640 stores information and/or software related to the operation and use of the device 1600. For example, the storage component 1640 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 1650 includes a component that permits the device 1600 to receive information, such as via user input (e.g. a touch screen display, a keyboard, a keypad, a mouse, a button, a switch, and/or a microphone). Additionally, or alternatively, the input component 1650 may include a sensor for sensing information (e.g. a global positioning system (GPS) component, an accelerometer, a gyroscope, and/or an actuator). The output component 1660 includes a component that provides output information from the device 1600 (e.g. a display, a speaker, and/or one or more light-emitting diodes (LEDs)).

The communication interface 1670 includes a transceiver-like component (e.g., a transceiver and/or a separate receiver and transmitter) that enables the device 1600 to communicate with other devices, such as via a wired connection, a wireless connection, or a combination of wired and wireless connections. The communication interface 1670 may permit the device 1600 to receive information from another device and/or provide information to another device. For example, the communication interface 1670 may include an Ethernet interface, an optical interface, a coaxial interface, an infrared interface, a radio frequency (RF) interface, a universal serial bus (USB) interface, a Wi-Fi interface, a cellular network interface, or the like.

The device 1600 may perform one or more processes described herein. The device 1600 may perform these processes in response to the processor 1620 executing software instructions stored by a non-transitory computer-readable medium, such as the memory 1630 and/or the storage component 1640. A computer-readable medium is defined herein as a non-transitory memory device. A memory device includes memory space within a single physical storage device or memory space spread across multiple physical storage devices.

Software instructions may be read into the memory 1630 and/or the storage component 1640 from another computer-readable medium or from another device via the communication interface 1670. When executed, software instructions stored in the memory 1630 and/or the storage component 1640 may cause the processor 1620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 16 are provided as an example. In practice, the device 1600 may include additional components, fewer components, different components, or differently arranged components than those shown in FIG. 16. Additionally, or alternatively, a set of components (e.g. one or more components) of the device 1600 may perform one or more functions described as being performed by another set of components of the device 1600.

According to one or more embodiments of the present disclosure, there may also be provided a computer readable storage medium storing instructions, wherein the instructions, when run by at least one computing apparatus, cause the at least one computing apparatus to perform a method for scheduling I/O request as described above.

Examples of computer readable storage media herein include: Read Only Memory (ROM), Random Access Programmable Read Only Memory (RAPROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue-ray or optical disk storage, Hard Disk Drive (HDD), Solid State Drive (SSD), card storage (e.g., multimedia cards, secure digital (SD) cards or extremely fast digital (XD) cards), magnetic tapes, floppy disks, magneto-optical data storage devices, optical data storage devices, hard disks, solid state disks, and any other devices that are configured to store computer programs and any associated data, data files and data structures in a non-transitory manner and provide the computer programs and any associated data, data files and data structures to a processor or computer so that the processor or computer may execute the computer programs. The instructions or computer programs in the computer readable storage medium described above may be executed in an environment deployed in a computer device, such as client, host, proxy device, server, etc. In addition, in one example, the computer programs and any associated data, data files, and data structures are distributed on a networked computer system, so that the computer programs and any associated data, data files, and data structures are stored, accessed and executed through one or more processors or computers in a distributed manner. It should be noted that the instructions may also be used to perform additional operations in addition to the operations described above or to perform more specific processing when performing the operations described above, and the content of these additional operations and further processing has already been referred to in the process of describing the relevant methods, and will therefore not be repeated herein in order to avoid repetition.

Another embodiment of the present disclosure involves a system including at least one computing apparatus and at least one storage apparatus storing instructions, wherein the instructions, when run by the at least one computing apparatus, cause the at least one computing apparatus to perform a method for scheduling I/O request as described above.

It should be noted that a system according to the exemplary embodiment of the present disclosure may rely entirely on operation of a computer program or instructions to implement the corresponding functions, i.e., the individual units correspond to the operations in the functional architecture of the computer program, such that the entire system is invoked to implement the corresponding functions by means of specialized software packages (e.g., libraries).

On the other hand, when the above system is implemented as software, firmware, middleware, or microcode, program code or code segments for performing the corresponding operations may be stored in a computer readable medium, such as a storage medium, such that at least one processor or at least one computing apparatus may perform corresponding operations by reading and running the corresponding program code or code segments.

According to one or more embodiments of the present disclosure, a storage apparatus may be integrated with a computing apparatus, e.g., RAM or a flash memory is deployed in an integrated circuit microprocessor, etc. In addition, the storage apparatus may include a separate apparatus, such as an external disk drive, a storage array, or any other storage apparatus that may be used by a database system. The storage apparatus and the computing apparatus may be operationally coupled or may communicate with each other, for example, via I/O ports, network connection, and the like, such that the computing apparatus is capable of reading instructions stored in the storage apparatus.

Another embodiment of the present disclosure involves a computer program product including a computer program/instruction, wherein the computer program/instruction, when run by a processor, may implement any method for scheduling I/O request as described above.

The method and apparatus for scheduling I/O request, the electronic device, the storage medium, the system, and the computer program product according to the present disclosure may adjust a quantity threshold value for a readahead request scheduled from a virtual file system to a block layer based on a request type included in a currently pending I/O request, thus may dynamically and proactively increase/decrease a suspended readahead request to yield task execution resources to an I/O request of a type that has a higher update frequency and/or read frequency or more affects user experience, such as yielding to a synchronization request, etc.; and, in a case of an abundance of current task execution resources, utilization of a storage device may be improved by increasing the quantity threshold value for the readahead request scheduled from the virtual file system to the block layer. Analyzing a type component of a pending request and combining it with limited readahead may avoid significant increase in latency of high-priority I/O due to priority reverse caused by readahead, and may increase storage utilization to achieve Host-level Aware Scheduling (HAS).

In addition, the block layer may dynamically adjust the number of readahead requests and asynchronous write requests to be scheduled based on states of the synchronous request and the like in the current queue, in order to yield task execution resources, such as storage bandwidth, to an I/O request of a type that has a higher update frequency and/or read frequency or more affects the user experience or by means of limited readahead and limited write.

In addition, limited write may be used to address read/write interference to reduce an asynchronous write request, and ensure that a write operation is in progress while other read or write operations are blocked.

In addition, limiting the number of readahead requests and asynchronous write requests may also prevent priority reverse for device-level scheduling.

In addition, Weighted Round Robin (WRR) arbitration is implemented in the I/O controller according to a strategy for prioritizing a request of high weight to be written to the storage device by allocating the weights to the respective request queues according to the types and categories of the requests, which may be combined with the limitation of the number of readahead requests and asynchronous write requests to better prevent priority reverse of device-level scheduling.

In addition, adjusting the weights of the respective request queues according to the desired ratio range, and writing the I/O requests stored in the respective request queues to the TW buffer of the storage system sequentially according to the adjusted weights from the highest to the lowest, may avoid the TW buffer congestion and further long latency that may be caused by too many I/O requests with high weight prioritized to be written to the TW buffer, and may also avoid the problem of not being able to satisfy the buffer bandwidth utilization and other demands that may be caused by too many I/O requests with low weight.

In addition, by using block layer I/O scheduling with limited readahead, limited write, and dynamic readahead, priority reverse and read/write interference may be prevented, with superior performance and lower I/O latency compared to schedulers that primarily use the CFQ-only algorithm.

In addition, by defining the I/O scheduling mechanism from the block layer to the device layer, as well as the scheduling technique and the data storage method from the host to the device, I/O requests may be distributed and written for different I/O data types, categories, and priorities, which may optimize latency and buffer utilization on the UFS device.

In addition, the storage device may dynamically resize the TW buffer based on the priority and number of pending requests and may pin the size of the TW buffer to further improve cache bandwidth utilization.

The above describes various exemplary embodiments of the present disclosure, and it should be understood that the above description is only exemplary and not exhaustive, and the present disclosure is not limited to the disclosed exemplary embodiments. Without departing from the scope and spirit of the present disclosure, many modifications and changes will be apparent to a person of ordinary skill in the art. Therefore, the scope of protection of the present disclosure should be based on the scope of the claims.

What is claimed is:

1. A method for scheduling an I/O request, the method comprising:

acquiring information of a pending I/O request, wherein the pending I/O request comprises a first I/O request suspended in a command queue or a request queue, and the information of the pending I/O request comprises a request type contained in the pending I/O request;

adjusting a first preset threshold value based on the acquired information of the pending I/O request, wherein the first preset threshold value is a quantity threshold value for a readahead request in a second I/O request in the request queue scheduled from a virtual file system to a block layer; and scheduling the I/O request in the request queue scheduled from the virtual file system to the block layer based on the adjusted first preset threshold value.

2. The method as claimed in claim 1, wherein the scheduling of the second I/O request in the request queue scheduled from the virtual file system to the block layer based on the adjusted first preset threshold value comprises:

scheduling one or more I/O requests scheduled from the virtual file system to the block layer based on the adjusted first preset threshold value;

dispatching, to an asynchronous queue and a synchronous queue under a corresponding task, the one or more I/O requests scheduled to the block layer, wherein a request type dispatched to the synchronous queue comprises a synchronous request and the readahead request, and a request type dispatched to the asynchronous queue comprises an asynchronous write request;

allocating corresponding priorities to the synchronous queue and the asynchronous queue, wherein the synchronous queue has a higher priority than the asynchronous queue; and scheduling the one or more I/O requests in the synchronous queue and the asynchronous queue to the request queue of the block layer based on the allocated priorities.

3. The method as claimed in claim 2, wherein in the synchronous queue, the synchronous request has a higher priority than the readahead request.

4. The method as claimed in claim 1, further comprising:

adjusting a second preset threshold value or a third preset threshold value based on the information of the pending I/O request, wherein the second preset threshold value is a quantity threshold value for the readahead request scheduled in the block layer, and the third preset threshold value is a quantity threshold value for an asynchronous write request scheduled in the block layer; and scheduling the readahead request to be scheduled in the block layer or the asynchronous write request to be scheduled in the block layer based on the adjusted second preset threshold value or third preset threshold value.

5. The method as claimed in claim 4, wherein the adjusting the second preset threshold value or the third preset threshold value based on the information of the pending I/O request comprises:

adjusting a sum of the second preset threshold value and the third preset threshold value to a maximum length of a request queue that is processed by a storage system or an I/O controller, in a case where the pending I/O request does not contain a synchronous request.

6. The method as claimed in claim 4, wherein the adjusting the second preset threshold value or the third preset threshold value based on the information of the pending I/O request comprises:

decreasing a sum of the second preset threshold value and the third preset threshold value in a case where the pending I/O request contains a synchronous request.

7. The method as claimed in claim 1, further comprising:

dispatching, to a plurality of request queues corresponding to request types, respectively, one or more I/O requests scheduled to an I/O controller;

allocating corresponding weights to respective request queues in the plurality of request queues based on the request types that the respective request queues are respectively dispatched;

determining a write order corresponding to respective request queues based on the corresponding weights allocated to the respective request queues; and sequentially writing the one or more I/O requests dispatched to the respective request queues to a storage system based on the write order corresponding to the respective request queues.

8. The method as claimed in claim 7, wherein the sequentially writing the one or more I/O requests dispatched to the respective request queues to the storage system based on the write order corresponding to the respective request queues further comprises:

acquiring ratios between different levels of weights in the corresponding weights of the respective request queues, and adjusting the corresponding weights of the respective request queues based on a preset range of ratios, wherein the corresponding weights of the respective request queues are divided into a plurality of levels according to a weight value; and writing, to the storage system, the one or more I/O requests dispatched to the respective request queues based on the adjusted corresponding weights of the respective request queues.

9. The method as claimed in claim 7, wherein the sequentially writing the one or more I/O requests dispatched to the respective request queues to the storage system based on the write order corresponding to the respective request queues further comprises:

sequentially writing the one or more I/O requests dispatched to the respective request queues to a corresponding buffer in the storage system based on the write order corresponding to the respective request queues.

10. The method as claimed in claim 9, further comprising:

resizing the corresponding buffer in the storage system based on the corresponding weights allocated to the respective request queues and the number of the request queues.

11. The method as claimed in claim 9, wherein the sequentially writing the one or more I/O requests dispatched to the respective request queues to the corresponding buffer in the storage system based on the write order corresponding to the respective request queues further comprises:

sequentially writing, to the corresponding buffer in the storage system, a synchronous read request or a read request from a foreground application, a synchronous write request, a readahead request, and an asynchronous request from a background application.

12. The method as claimed in claim 7, wherein the corresponding weights allocated to the respective request queues are used to prioritize writing an I/O request with a type of an update frequency that exceeds a threshold or a read frequency that exceeds the threshold.

13. The method as claimed in claim 1, wherein the adjusting the first preset threshold value based on the acquired information of the pending I/O request further comprises:

decreasing or maintaining the first preset threshold value in a case where the pending I/O request comprises a synchronous request; or increasing the first preset threshold value in a case where the pending I/O request comprises at least a preset number of asynchronous write requests, wherein the information of the pending I/O request further comprises a number of asynchronous write requests in the pending I/O request.

14. An electronic device comprising:

at least one processor;

at least one memory storing computer-executable instructions, wherein the computer-executable instructions, when run by the at least one processor, cause the at least one processor to perform a method for scheduling an I/O request according to claim 1.

15. An apparatus for scheduling an I/O request, the apparatus comprising:

a memory storing one or more instructions; and a processor operatively coupled to the memory and configured to execute one or more instructions stored in the memory, wherein the one or more instructions, when executed by the processor, cause the apparatus to:

acquire information of a pending I/O request, wherein the pending I/O request comprises a first I/O request suspended in a current command queue or a request queue, and the information of the pending I/O request comprises a request type contained in the pending I/O request;

adjust a first preset threshold value based on the acquired information of the pending I/O request, wherein the first preset threshold value is a quantity threshold value for a readahead request in a second I/O request in the request queue scheduled from a virtual file system to a block layer; and schedule the I/O request in the request queue scheduled from the virtual file system to the block layer based on the adjusted first preset threshold value.

16. The apparatus as claimed in claim 15, wherein the one or more instructions, when executed by the processor, further cause the apparatus to:

schedule one or more I/O requests scheduled from the virtual file system to the block layer based on the adjusted first preset threshold value;

dispatch, to an asynchronous queue and a synchronous queue under a corresponding task, the one or more I/O requests scheduled to the block layer, wherein a request type dispatched to the synchronous queue comprises a synchronous request and the readahead request, and a request type dispatched to the asynchronous queue comprises an asynchronous write request;

allocate corresponding priorities to the synchronous queue and the asynchronous queue, wherein the synchronous queue has a higher priority than the asynchronous queue; and schedule the one or more I/O requests in the synchronous queue and the asynchronous queue to the request queue of the block layer based on the allocated priorities.

17. The apparatus as claimed in claim 16, wherein in the synchronous queue, the synchronous request has a higher priority than the readahead request.

18. The apparatus as claimed in claim 15, wherein the one or more instructions, when executed by the processor, further cause the apparatus to:

adjust a second preset threshold value or a third preset threshold value based on the information of the I/O request, wherein the second preset threshold value is a quantity threshold value for a readahead request scheduled in the block layer, and the third preset threshold value is a quantity threshold value for an asynchronous write request scheduled in the block layer; and schedule the readahead request to be scheduled in the block layer or the asynchronous write request to be scheduled in the block layer based on the adjusted second preset threshold value or third preset threshold value.

19. The apparatus as claimed in claim 18, wherein the one or more instructions, when executed by the processor, further cause the apparatus to:

adjust a sum of the second preset threshold value and the third preset threshold value to a maximum length of a request queue that is processed by a storage system or an I/O controller, in a case where the pending I/O request does not contain a synchronous request.

20. The apparatus as claimed in claim 18, wherein the one or more instructions, when executed by the processor, further cause the apparatus to:

decrease a sum of the second preset threshold value and the third preset threshold value in a case where the pending I/O request contains a synchronous request.

* * * * *